(12) United States Patent
Lee et al.

(10) Patent No.: US 8,787,378 B2
(45) Date of Patent: Jul. 22, 2014

(54) SYSTEMS AND METHODS TO IMPROVE PERFORMANCE OF TCP OVER LARGE BANDWIDTH-DELAY-PRODUCT NETWORKS

(75) Inventors: Yiu Bun Lee, Hong Kong (CN); Wing San Wan, Hong Kong (CN)

(73) Assignee: The Chinese University of Hong Kong, Hong Kong (HK)

( * ) Notice: Subject to any disclaimer, the term of this patent is extended or adjusted under 35 U.S.C. 154(b) by 105 days.

(21) Appl. No.: 13/337,772

(22) Filed: Dec. 27, 2011

(65) Prior Publication Data

US 2012/0163385 A1 Jun. 28, 2012

Related U.S. Application Data

(60) Provisional application No. 61/427,675, filed on Dec. 28, 2010.

(51) Int. Cl.
*H04L 12/28* (2006.01)

(52) U.S. Cl.
USPC .......................................................... 370/392

(58) Field of Classification Search
None
See application file for complete search history.

(56) References Cited

U.S. PATENT DOCUMENTS

| | | | |
|---|---|---|---|
| 6,438,101 B1 | 8/2002 | Kalampoukas et al. | |
| 2002/0150049 A1* | 10/2002 | Collier et al. | 370/236 |
| 2002/0194361 A1* | 12/2002 | Itoh et al. | 709/233 |
| 2003/0156542 A1* | 8/2003 | Connor | 370/236 |
| 2004/0066746 A1* | 4/2004 | Matsunaga | 370/235 |
| 2004/0196860 A1* | 10/2004 | Gao et al. | 370/437 |
| 2005/0141419 A1* | 6/2005 | Bergamasco et al. | 370/230 |
| 2006/0059268 A1 | 3/2006 | Victor et al. | |
| 2006/0120289 A1 | 6/2006 | Cunningham | |
| 2007/0165531 A1* | 7/2007 | Labrador et al. | 370/235 |
| 2008/0126562 A1* | 5/2008 | Ludwig et al. | 709/235 |
| 2008/0304415 A1 | 12/2008 | Cunningham | |
| 2009/0279429 A1* | 11/2009 | Griffoul | 370/230 |
| 2010/0215057 A1* | 8/2010 | Frink et al. | 370/474 |
| 2010/0322249 A1* | 12/2010 | Thathapudi et al. | 370/395.1 |

FOREIGN PATENT DOCUMENTS

| | | |
|---|---|---|
| CN | 1778079 A | 5/2006 |
| CN | 101040278 A | 9/2007 |
| CN | 1787487 B | 7/2010 |
| WO | WO-2012/089110 A1 | 7/2012 |

OTHER PUBLICATIONS

"International Application Serial PCT/CN20111/084762, International Search Report mailed Apr. 5, 2012", 4 pgs.
"International Application Serial PCT/CN20111/084762, Written Opinion mailed Apr. 5, 2012", 4 pgs.

(Continued)

*Primary Examiner* — Chi Pham
*Assistant Examiner* — Fahmida Chowdhury
(74) *Attorney, Agent, or Firm* — Schwegman, Lundberg & Woessner, P.A.

(57) ABSTRACT

The apparatus, systems, and methods described herein may operate to receive at least one data packet from a transmitter connected to a first network. A packet forwarding time may be scheduled for the at least one data packet. The at least one data packet may be forwarded to a receiver connected to a second network based on the packet forwarding time such that transmission of the at least one data packet prevents a buffer overflow at the receiver.

20 Claims, 28 Drawing Sheets

(56) References Cited

OTHER PUBLICATIONS

Allman, M., et al., "RFC 3390—Increasing TCP's Initial Window", © 2002 The Internet Society, (Oct. 2002), 17 pgs.

Davis, J., "The Cable Guy: TCP Receive Window Auto-Tuning", © 2008 Microsoft Corporation [online]. [retrieved Jan. 5, 2012]. Retrieved from the Internet: <URL: http://technet.microsoft.com/en-us/magazine/2007.01.cableguy.aspx>, (2007), 6 pgs.

Fisk, M., et al., "Dynamic Right-Sizing in TCP", *International Conference on Computer Communications and Networks—ICCCN*, (2001), 1-7.

Gerla, M., et al., "Generalized Window Advertising for TCP Congestion Control", *Transactions on Emerging Telecommunications Technologies*, 13(6), (2002), 1-14.

Hacker, T. J., et al., "Improving Throughput and Maintaining Fairness using Parallel TCP", *IEEE INFOCOM*, (2004), 10 pgs.

Jacobson, V., et al., "Congestion Avoidance and Control", *In: Proceedings of the Sigcomm '88 Symposium*, (Nov. 1988), 1-25.

Jacobson, V., et al., "RFC 1323: TCP Extensions for High Performance", *Network Working Group*, (May 1992), 41 pgs.

Jin, C., et al., "FAST TCP: Motivation, Architecture, Algorithms, Performance", *Proceedings of IEEE INFOCOM*, (Mar. 2004), 12 pgs.

Kalampoukas, L., et al., "Explicit Window Adaptation: A Method to Enhance TCP Performance", *IEEE/ACM Transactions on Networking*, vol. 10(3), (Jun. 2002), 338-350.

Lee, J., et al., "Applied Techniques for High Bandwidth Data Transfers across Wide Area Networks", *In: Proceedings International Conference on Computing in High Energy and Nuclear Physics (CHEP01)*, (2001), 1-9.

Leith, D., et al., "H-TCP: TCP for high-speed and long-distance networks", In: *Proceedings Second International Workshop on Protocols for Fast Long-Distance Networks (PFLDnet)*, (2004), 1-16.

Rhee, I., et al., "CUBIC: A New TCP-Friendly High-Speed Variant", [online] 2008 Networking Research Lab. [archived Dec. 30, 2008]. Retrieved from the Internet: <URL: http://web.archive.org/web/20081230100301/http://www4.ncsu.edu/~rhee/export/bitcp/cubic-paper.pdf>, (2008), 6 pgs.

Sivakumar, H., et al., "PSockets: The Case for Application-level Network Striping for Data Intensive Applications using High Speed Wide Area Networks", *Proceedings of the 2000 ACM/IEEE Conference on Supercomputing*, (2000), 6 pgs.

Xu, L., et al., "Binary Increase Congestion Control (BIC) for Fast Long-Distance Networks", *Proceedings of IEEE INFOCOM*, (2004), 11 pgs.

"International Application Serial PCT/CN2011/084762, International Preliminary Report on Patentability mailed Apr. 4, 2013", 17 pgs.

\* cited by examiner

```
i ← 0 //start from the 0-th packet
loss ← NULL
WHILE i != tail+1 DO //tail marks the last packet received from sender
    IF loss == NULL THEN
        schedule_transfer(pkt_i) //request the scheduling algorithm to transfer
    ELSE
        IF i ≥ loss + a_max THEN // a_max as the maximum AWnd
            schedule_transfer(pkt_i)
        END IF
    END IF IF DupACK == NULL THEN //DupACK is packet no. to be retransmitted
        i = i + 1
    ELSE
        i ← DupACK
        loss ← DupACK
        DupACK ← NULL
    END IF
                                        END DO
```

*FIG. 12*

SYSTEMS AND METHODS TO IMPROVE PERFORMANCE OF TCP OVER LARGE BANDWIDTH-DELAY-PRODUCT NETWORKS

CROSS REFERENCE TO RELATED APPLICATIONS

The present application claims the priority benefit of U.S. Provisional Patent Application Ser. No. 61/427,675 filed Dec. 28, 2010 and entitled "SYSTEMS AND METHODS TO IMPROVE PERFORMANCE OF TCP OVER LARGE BANDWIDTH-DELAY-PRODUCT NETWORKS," of which application is incorporated herein by reference in its entirety.

BACKGROUND INFORMATION

The emergence of mobile data networks, such as 3G, 3.5G, and 4G is progressively reshaping the Internet landscape from almost entirely wired broadband Internet users, to more and more users connected via wireless links. Although widely used as a core Internet transport protocol for the Internet, Transmission Control Protocol (TCP) has shown performance limitations, especially when operated in mobile data network environments. For example, three fundamental problems of running TCP in modern mobile data networks have limited achieving a higher speed of data packet transmission and, thus, enhanced user experience: (a) flow-control-limited throughput due to larger bandwidth-delay product (BDP); (b) wireless link capacity estimation; and (c) false congestion avoidance due to random loss.

BRIEF DESCRIPTION OF THE DRAWINGS

FIG. 12 shows pseudo code for data transmission with the local retransmission capability according to various embodiments.

DETAILED DESCRIPTION

Figure 1:
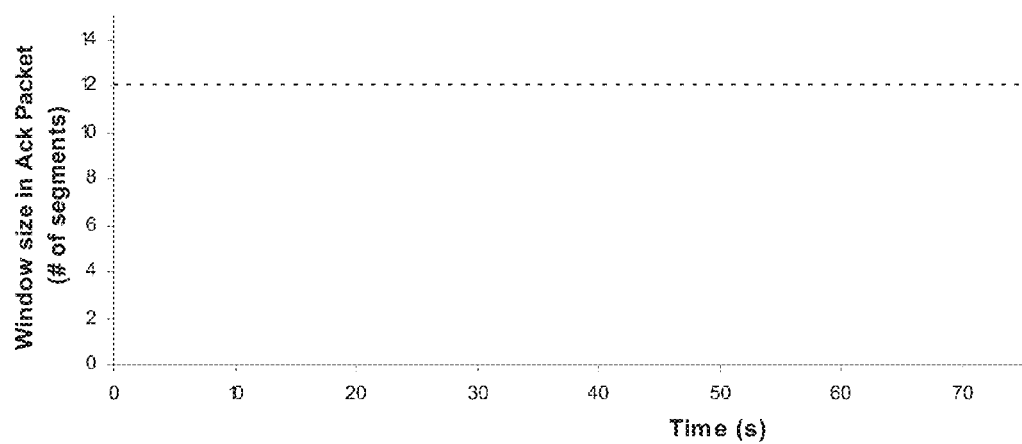
FIG. 1 shows the dynamics of reported window size according to various embodiments.

The emergence of mobile data networks such as 3G, 3.5G, and 4G is progressively reshaping the Internet landscape from almost entirely wired broadband Internet users, to more and more users connected via wireless links. Investigation is made with respect to the performance limitations of the core Internet transport protocol—Transmission Control Protocol (TCP), when operated in mobile data network environments; and various embodiments are proposed to develop a novel network-centric mobile accelerator to overcome such limitations without changing the core TCP transport module at either end of the connection (i.e., server and client). For example, three fundamental problems of running TCP in modern mobile data networks are investigated: (a) flow-control-limited throughput due to larger bandwidth-delay product (BDP); (b) wireless link capacity estimation; and (c) false congestion avoidance due to random loss, and novel solutions are proposed for implementation in the network-centric accelerator. Experimental results conducted in production 3G HSPA networks show that the accelerator according to various embodiments can increase the throughput performance of TCP by up to about 2.5 times of the unaccelerated TCP. In addition, the proposed accelerator according to various embodiments does not require modification to software (S/W) and/or Internet applications (hereinafter "application"), TCP implementation at the hosts, or operating system; and thus can be readily deployed in current and future mobile data networks.

Chapter 1: Introduction

The emergence of mobile data networks, such as 3G, 3.5G, and 4G is progressively reshaping the Internet landscape from almost entirely wired broadband Internet users, to more and more users connected via wireless links. As demonstrated below in detail, this change could have profound impact on the performance of many Internet applications and services given the many fundamental differences between wired and wireless networks. Various embodiments of the invention investigate the performance limitations of the core Internet transport protocol—Transmission Control Protocol (TCP), when operated in mobile data network environments; and propose a novel network-centric mobile accelerator to overcome such limitations without changing the core TCP transport module at either end of the connection (i.e., server and client).

Specifically, three fundamental problems of running TCP in modern mobile data networks are investigated: (a) flow-control-limited throughput due to larger bandwidth-delay product (BDP); (b) wireless link capacity estimation; and (c) false congestion avoidance due to random loss. For (a), various embodiments are proposed to develop a novel virtual advertised window mechanism to decouple flow control between the client and the server so that the server's transmission throughput is not limited by the receiver advertized window size. For (b), various embodiments are proposed to develop a rate-based algorithm (as oppose to credit-based approach in TCP) to continuously estimate and adapt the data transmission rate over the mobile data network. For (c), various embodiments are proposed to develop a novel RTT modulation technique to effectively suppress packet loss events from the TCP sender so that high throughput can be sustained despite the existence of random packet loss.

Unlike previous works which rely on modifications to the TCP protocol stack at the sender, at the receiver, at both ends, or at the network, various embodiments are proposed to develop a network-centric approach where the above-mentioned protocol processing algorithms may be implemented in a network device—mobile accelerator, which in turn may be deployed at the edge of the mobile data network linking it to the rest of the Internet.

This network-centric approach has, for example, four significant advantages over existing technologies. First, it may eliminate the need to modify the TCP module in either the TCP sender or the TCP receiver. Considering that many modern operating systems are proprietary and slow to adopting any protocol modifications, this network-centric approach may allow a far more rapid adoption and deployment of the proposed protocol optimizations. Second, even if the TCP module can be modified, some of the optimizations such as local retransmission (c.f., Chapter 5) simply cannot be effectively implemented in the end hosts. Third, the proposed protocol optimization algorithms may be designed specifically for mobile data networks. Thus, if it is implemented in the end host such as the server, it may need to determine the type of network a client is accessing before the appropriate protocol optimizations can be applied. Finally, in practice, many mobile operators may deploy their own web proxies to reduce Internet bandwidth consumption and to implement proprietary value added services. Consequently, the Internet server (e.g., web server) may not even be communicating with the client device directly at all. In this case the TCP connection between the server and the proxy may be independent from the TCP connection between the proxy and the client. Hence protocol optimization performed at the server end may never reach the mobile data network, rendering it useless.

In addition to TCP throughput improvement, the proposed mobile accelerator according to various embodiments may also open up a new platform for implementing sophisticated network traffic controls. For example, various embodiments are proposed to develop a packet scheduling mechanism which can perform precise bandwidth allocation among competing TCP flows. This opens the way to many other interesting traffic regulation applications of which some will be discussed in Chapter 9.

The rest of the instant patent application is organized as follows: reviews previous related works. [0054] investigates the performance problem of TCP's flow control mechanism in mobile data networks. Chapter 4 presents the virtual advertized window mechanism to overcome TCP's flow control bottleneck. Chapter 5 investigates packet loss in mobile data networks and presents a local retransmission algorithm. Chapter 6 presents the RTT modulation mechanism for loss event suppression. Chapter 7 presents a packet scheduling mechanism for precise bandwidth allocation. Chapter 8 reports performance of the proposed mobile accelerator in production 3G networks. Chapter 9 outlines some additional embodiments and Chapter 10 concludes the study.

Chapter 2: Background and Related Work

Much research had been done to improving the performance of TCP in large BDP networks. The existing works may be classified into four categories: modifying both sender and receiver; modifying the sender only; modifying the receiver only; and network-centric approach.

2.1 Sender-Receiver-Based Approaches

Approaches where both the sender and the receiver are modified are considered first. Jacobson et al. proposed in RFC 1323 the LWS extension to TCP which is currently the most widely supported solution. It works by scaling the Advertised Window (AWnd) by a constant factor throughout the connection. With the maximum LWS factor 14, the maximum AWnd can be increased up to about 1 GB $((2^{16}-1)*2^{14} \approx 2^{30})$. The strengths and weaknesses of LWS will be discussed in more detail in [0054].

Alternatively, an application(s) can be modified to initiate multiple TCP connections in parallel to increase throughput by aggregating multiple TCP connections. This approach effectively multiplies the AWnd and Congestion Window (CWnd) by the number of TCP flows and so can mitigate the AWnd limitation. However, aggregating multiple TCP connections will also allow the application(s) to gain unfair amount of bandwidth from competing TCP flows and the aggregate CWnd may increase too rapidly. Hacker et al. solved this problem by deferring CWnd increase until multiple ACKs are received so as to compensate for the rapid CWnd growth.

2.2 Sender-Based Approaches

Apart from AWnd limit, the CWnd maintained by the sender may also limit TCP's throughput in large BDP networks. Specifically, the growth of the CWnd is triggered by the reception of ACKs. Thus, in a long delay path, it may take longer time for the CWnd to grow to a sufficiently large value so that the link bandwidth can be fully utilized.

To tackle this problem, Allman et al. proposed in RFC 3390 to initialize the CWnd to a larger value (as opposed to one TCP segment) so that it can grow more quickly in large delay networks to ramp up TCP's throughput. Since then, much effort had been put into developing more sophisticated congestion control algorithms, such as CUBIC, BIC, FAST, and H-TCP to further shorten TCP's throughput ramp up time and provide better fairness among different TCP connections. These solutions tackled the limitation of CWnd growth.

Another problem affecting the CWnd and throughput is the existence of non-congestion-induced packet loss in mobile data networks. As TCP would reduce CWnd upon detection of packet loss, its throughput performance will be severely degraded in the presence of non-congestion-induced packet losses. Lai et al. proposed a TCP-NCL protocol for wireless networks such as WiFi to differentiate between congestion loss from random packet loss; and to handle packet reordering in case the link layer also retransmit packets. Nevertheless, the performance of these sender-based approaches in mobile data networks is still subject for further investigation, and in cases where the mobile network implemented proxy servers, then they will have no effect at all as the sender will only be communicating with the proxy server.

2.3 Receiver-Based Approaches

At the receiving end, Fisk and Feng proposed dynamic right-sizing of the AWnd by estimating the CWnd at the receiver and then dynamically adapt the receiver buffer size, i.e., the AWnd, to twice the size of the estimated CWnd. This ensures that when the sender's CWnd doubles (behavior of TCP New Reno after receiving an ACK), the AWnd will not become the bottleneck.

More recent Operating Systems such as Linux 2.4 and Microsoft® Windows® Vista® also implemented receiver buffer size auto-tuning by estimating the BDP of the connection and the data consumption rate of the application. In comparison, the accelerator according to various embodiments of the invention does not require any modification to the receiver application or require support from the receiver operating system, and so can be more readily deployed by an ISP or a satellite operator to accelerate all bandwidth demanding TCP traffics.

2.4 Network-Centric Approach

The fourth approach is to implement protocol optimizations within the network. The Snoop protocol adopts this approach by keeping copies of transmitted packets in the base station's cache, and then retransmitting them on behalf of the sender when packet loss occurs. However, the extra delay incurred by the retransmission process could also trigger the sender to timeout which in turn will lead to severe throughput degradation. Various embodiments of the invention tackled this problem through a novel RTT modulation mechanism (c.f. Chapter 6) which can actively prevent sender timeout in case of local retransmission.

Another study by Hu and Yeung proposed a new active queue management protocol whereby the network device such as a router or a base station, generates duplicate ACKs to trigger CWnd reduction at the sender whenever the device's packet queue length exceeds a certain threshold, thus preventing congestion from taking place.

Chapter 3: TCP Flow Control Revisited

TCP's built-in flow control mechanism is designed to prevent a fast sender from overflowing a slow receiver. It works by reporting the receiver's buffer availability, i.e., the AWnd, back to the sender via a 16-bit field inside the TCP header so that the sender would not send more data than the receiver's buffer can store.

Over the years, computer processing power has grown tremendously such that even today's modest computers can easily keep up with the arriving stream of data at relatively high data rates (e.g., tens of Mbps). Thus, an arrived packet will quickly be retrieved by an application from the receiver buffer, and in most cases this can be completed even before the next packet arrives. As a result, the reported AWnd simply stays at the maximum receiver buffer size as illustrated in Error! Reference source not found. which shows the actual AWnd of a receiver at a throughput of about 1.5 Mbps according to various embodiments. In this case, TCP's flow control mechanism is clearly not necessary as the sender never transmits data faster than the receiver's processing rate.

Figure 2:
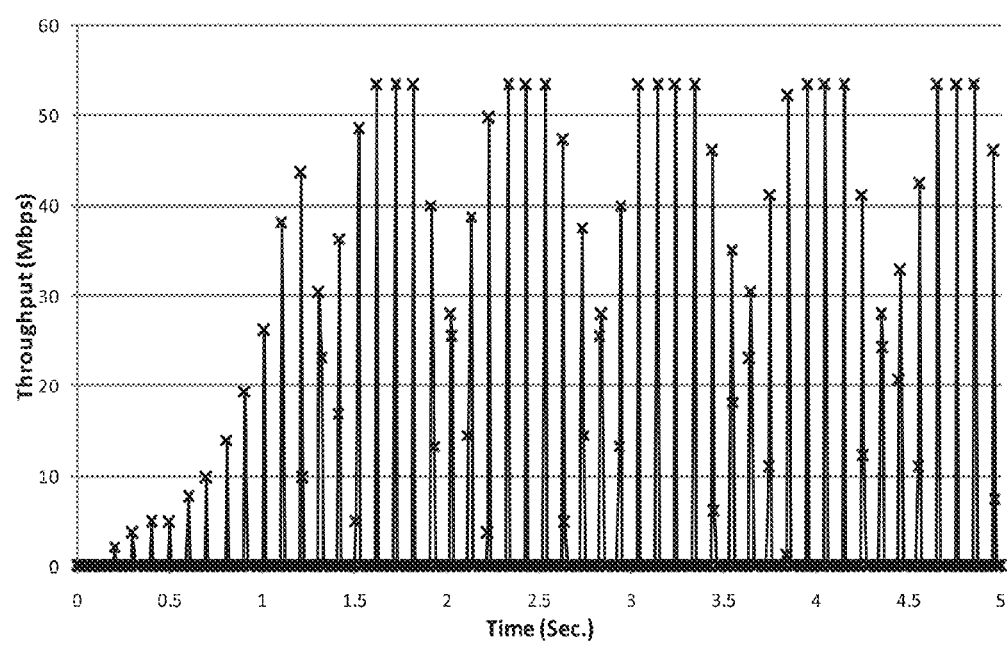
FIG. 2 shows stop-and-go behavior due to large BDP compared with Awnd according to various embodiments.

Due to the delayed AWnd, the sender cannot send more than the reported AWnd and thus cannot make use of the new freed buffer space at the receiver. In cases where the BDP is larger than the maximum AWnd, the sender will operate in a stop-and-go manner, as illustrated in FIG. 2, resulting in severe underutilization of the network channel.

For example, a 3G HSPA data network has bandwidth ranging from 3.6 Mbps to 14.4 Mbps. Take the commonly offered bandwidth 7.2 Mbps with round-trip-delay (RTT) of 100 ms as an example. This set of network parameters will lead to a BDP of 90 KB which already exceeds TCP's maximum advertised window size of 64 KB. In this case TCP's flow control mechanism will limit the throughput to no more than 5.1 Mbps which leave about 29% of bandwidth unused even if there are no competing traffics in the network.

The conventional solution—TCP's Large Window Scale extension, was designed specifically to address this limitation by allowing the two hosts of a TCP connection to negotiate a constant multiplying factor to be applied to the AWnd value during connection setup so that AWnd larger than 64 KB can be used. Obviously, this requires both communicating hosts to support and activate the use of LWS prior to connection setup is carried out. Unfortunately, although most modern operating systems support LWS, there is no standard way for the application to activate the use of LWS. Some operating systems activate LWS by default (e.g., Windows Vista), some requires manual configuration (e.g., Windows XP), and yet others require an application to explicitly configure a large (e.g., >64 KB) socket buffer to activate it.

For example, the common operating system such as Microsoft® Windows® XP® defaults its advertised window size to 17 KB for connections with link capacity at or below 10 Mbps. Running over a 3G HSPA data network, this advertised window size will limit the achievable throughput of TCP to about 1.4 Mbps at a RTT of 100 ms. While applications could configure a larger window size, e.g., by explicitly setting a larger socket buffer size, the inventors found that this is rarely done in practice. In fact, almost all common Internet applications evaluated on the Microsoft® Windows® platform, including web browsers (Internet Explorer, Firefox®, Google® Chrome®), FTP clients (Windows' built-in FTP client), and email clients (Outlook® Express), simply employ the operating system's advertized window size (e.g., 17 KB) and do not make use of TCP's LWS extension, therefore limiting their throughput performance in networks with large bandwidth-delay product.

Another limitation of LWS is that the AWnd value is still interpreted as the amount of buffer physically available at the receiver (and sender as well). Thus, for networks with very large BDP, the resultant buffer requirement can be very large as well (e.g., with LTE's 172.8 Mbps over 100 ms RTT a receiver buffer size of 21.6 MB will be needed). This could become a problem for applications that make use of large number of sockets (e.g., server applications) or for mobile devices with limited physical memory.

If FIG. 1 is reconsidered, then it is expected that such a large buffer at the receiver will end up mostly unused anyway as the received data will be retrieved out of the TCP receive buffer quickly by the application. Thus, instead of strictly following the reported receiver buffer size, various embodiments of the invention propose to reinterpret it as an indicator of receiver processing capacity and employ it for use in a rate-based flow control mechanism to be discussed in detail in the next Chapters.

Chapter 4: Opportunistic Transmission

Results from Chapter 3 reveal that the AWnd may turn out to become the bottleneck to achieving high throughput in modern mobile data networks. A trivial solution may be to eliminate the AWnd altogether as it is no longer serving its intended function. To experiment with this idea, in various embodiments, an accelerator may be implemented between the sender and the receiver as illustrated in Error! Reference source not found.FIG. 3.

In various embodiments, the accelerator's function may be, for example, to modify the AWnd field inside the TCP header of ACK packets from the receiver, to a value much larger than the BDP of the network to prevent it from becoming the bottleneck. In this experiment, for example, the Linux Netem module may be used to emulate a typical 3G HSPA data network. The emulation parameters including network delay and bandwidth may be obtained from measurement of a production 3G HSPA data network.

The sender, the accelerator, and the emulator may all run on Linux® with kernel 2.6 (with CUBIC as the default TCP congestion control module) and the receiver may run on Windows® XP® SP2. This network configuration may have a BDP of 90 KB which is larger than Windows XP's default receiver buffer size of 17 KB. The receiver may initiate the connection and then the sender may keep sending data to the receiver as fast as TCP allows.

Figure 4:
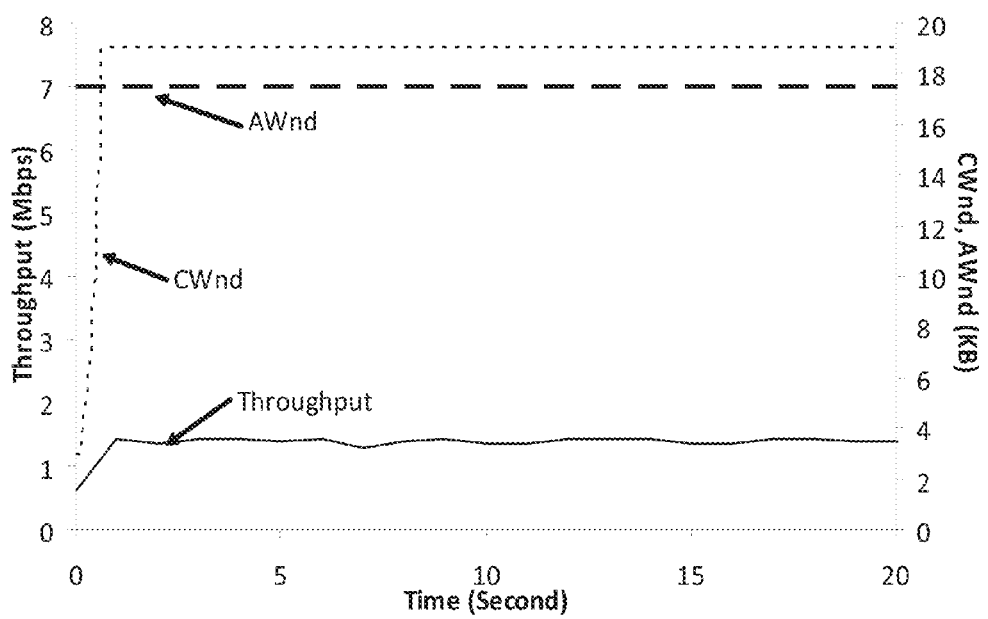
FIG. 4 shows CWnd and Throughput dynamics without accelerator according to various embodiments.

As a benchmark for comparison, an experiment may be conducted without any modification to the AWnd reported by the receiver. FIG. 4 shows the evolution of AWnd, CWnd, and throughput (as measured by the receiver) of the first 20 seconds of the experiment according to various embodiments. As expected, the AWnd may stay at the maximum value at all times. The CWnd, once increased passing the AWnd value, may stop increasing further even though there is no packet loss during the experiment. As a result, the achievable throughput may be limited by the window size and, as in this case, may be significantly lower than the network's capacity (i.e., about 1.41 Mbps versus about 7.2 Mbps).

In the second experiment, the accelerator may modify the AWnd reported by the receiver to 10 MB, regardless of the actual value of the AWnd reported. This may effectively disable TCP's flow control mechanism as the modified AWnd size may be larger than the largest value reached by the CWnd in the experiment.

Figure 5:
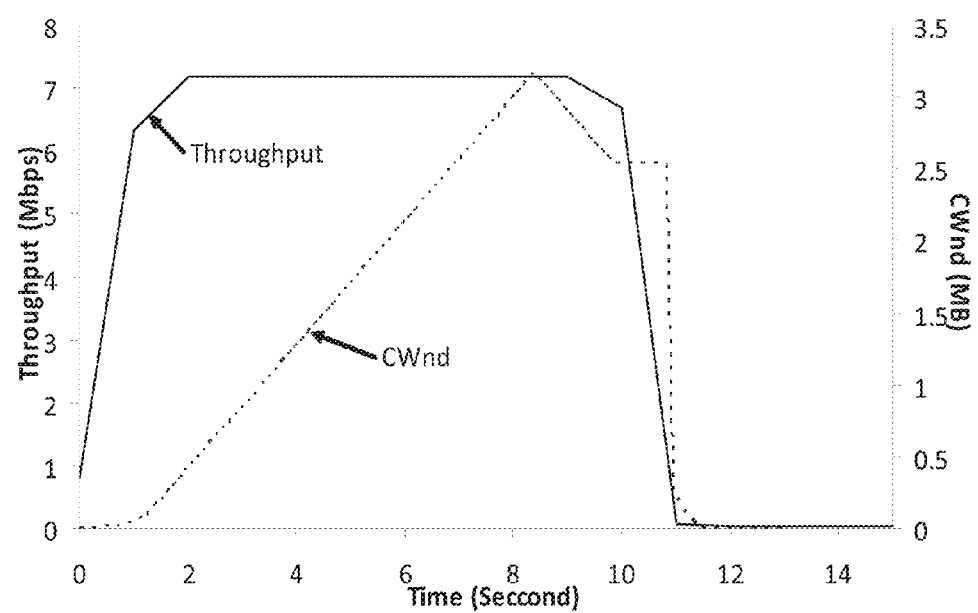
FIG. 5 shows CWnd and Throughput dynamics of the first 15 seconds with sender's flow control mechanism disabled according to various embodiments.

FIG. 5 shows the evolution of CWnd and throughput for the first 15 seconds of the experiment according to various embodiments. Compared to FIG. 4, it is observed that the CWnd may no longer be constrained by the AWnd and thus can continue to grow all the way up to about 3 MB. Similarly, the achievable throughput also continued to increase, only to be limited by the network's link capacity at 7.2 Mbps. However, the high throughput did not last very long and it abruptly dropped to zero after about 10 s.

Figure 6:
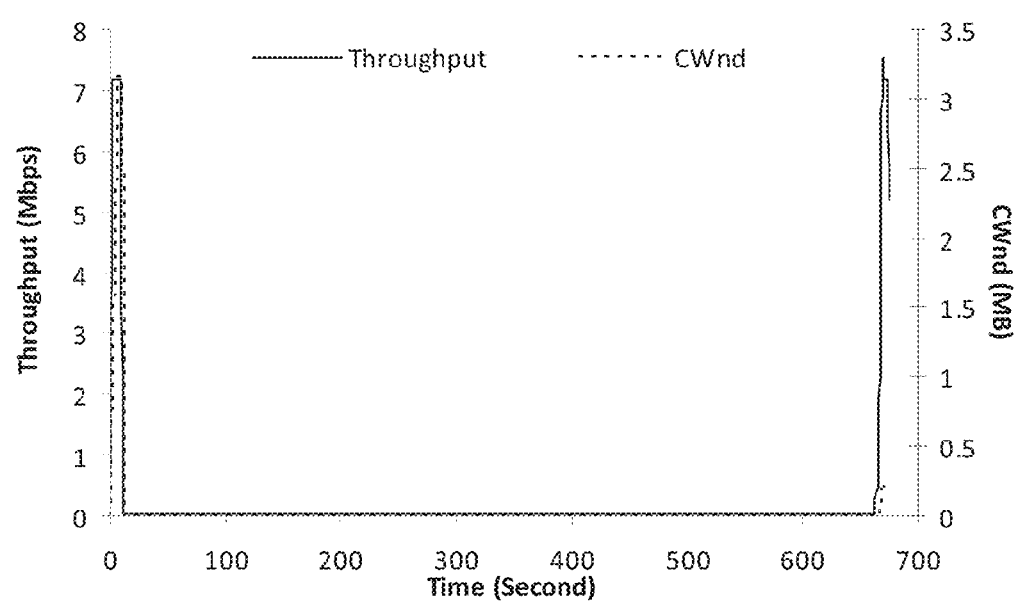
FIG. 6 shows CWnd and Throughput dynamics with sender's flow control mechanism disabled according to various embodiments.

Not surprisingly, this abrupt drop may be due to network congestion as the large CWnd allowed the sender to transmit at a rate even higher than the network link capacity. In fact, TCP was designed to induce congestion events in its probe for additional bandwidth in the network and react to congestion by lowering its transmission rate (via reduction in CWnd). What is unexpected is the drop to nearly zero throughput after the loss event. Moreover, this condition may continue for an extensive duration (over 600 s), as illustrated in FIG. 6, before the TCP flow can recover from it. This suggests that TCP congestion control algorithm may not function well without its flow control mechanism.

To understand the cause of the blackout period after a loss event, in various embodiments, the behavior of the receiver may be considered. Normally, when there is no packet loss, TCP segments arriving at the receiver may be quickly processed and passed to the application, thus releasing the occupied buffer space. However, when a packet loss occurs, all the subsequent data may need to be buffered until the lost packet is successfully retransmitted as TCP guarantees in-sequence data delivery. In normal TCP, the sender may stop transmitting data once the AWnd is used up and thus buffer overflow may never occur. Now, in case the AWnd is set to a value larger than the actual one, the sender may continue to send data, even beyond the buffer space available at the receiver. Consequently, these out-of-bound packets may all be discarded by the receiver due to buffer overflow, resulting in a very large burst of packet loss.

This may explain the evolution of the CWnd in FIG. 5. At time 8.49 s, the sender (running the default CUBIC congestion module in Linux) began receiving duplicate ACKs and started to reduce its CWnd linearly at a rate of one per two DUP-ACKs, until it reached a lower limit. This continued until the lost packet timed out, at which point the CWnd reset to one. Due to the large burst of packet loss induced, numerous timeout events followed and this was the reason for the extensive blackout period in FIG. 6. During this period, the sender repeatedly timed out and then retransmitted the lost packet, one at a time. Only after all the lost packets were successfully retransmitted, can the CWnd and hence, throughput resume growth.

The previous experiment clearly shows that the trivial solution of disabling TCP's flow control may end up degrading throughput performance rather than improving it. To prevent such blackout condition from occurring, in various embodiments, a way may be devised to control the packet transmission to prevent congesting the receiver and the network, and to develop a new retransmission algorithm to incorporate the effect of modifying the AWnd. Various embodiments to tackle the former problem will be discussed in the following sections and the retransmission algorithm will be further investigated in Chapter 5.

4.1 Link Bandwidth Estimation

To prevent congesting the network, the accelerator according to various embodiments may regulate the rate at which packets are forwarded to the receiver over the mobile data network. In various embodiments, a system model is developed, for example, to estimate the link bandwidth by assuming that (a) the accelerator always has data to forward; (b) network delays and receiver's processing capability remain constant; (c) network delays of the channel between the accelerator and the receiver are symmetric in the forward and the reverse direction; (d) the receiver generates an ACK immediately upon the arrival of a TCP segment, i.e., zero processing delay; and (e) the uplink, i.e., from the receiver to the accelerator, is not the bottleneck.

Let rtt be the RTT between the accelerator and the receiver. Obviously, the RTT is not known a priori and thus may need to be estimated from passive measurements of packets traversing the accelerator. Let fi be the time packet i was forwarded by the accelerator to the receiver, and let ti be the time at which the corresponding ACK arrived at the accelerator. Then, the RTT as measured by packet i, denoted by rtti, may be computed from:

$$rtt_i = t_i - f_i \tag{1}$$

To smooth out random fluctuations in the rtti, the accelerator may apply exponentially weighted moving average to the measured values to obtain the smoothed RTT rtt:

$$rtt = (1-a)'rtt + a'rtt_i \tag{2}$$

where the weight α=0.125 may follow the one used in TCP's internal RTT estimator.

Next, the link bandwidth may be estimated from the acknowledged sequence number and the arrival time of a pair of ACK packets using a formula similar to, assuming the receiver has infinite processing capacity. Specifically, let ti be the arrival time of ACK packet i with acknowledged sequence number ni. Then, for some positive integer k, the link bandwidth, denoted by ri, may be estimated from $$r_i = \frac{(n_{i+k} - n_i)}{t_{i+k} - t_i} \quad (3)$$

where the numerator may be the amount of data acknowledged during the time interval (ti,ti+k). The intuition behind (3) may be that the receiver, having infinite processing capacity, may generate an ACK packet immediately upon receiving a packet from the network. Thus, the transmission rate may be faster than the link bandwidth. Then, the rate at which packets departs from the network may be determined by the link bandwidth available.

The parameter k may control the duration of the estimation interval (in number of ACK packets) and may be adjusted to tradeoff between accuracy and timeliness of rate estimation. Also, exponentially weighted moving averaging similar to (2) may be applied to smooth out random fluctuations and obtain the smoothed estimated link bandwidth denoted by r.

In various embodiments, since the assumption of infinite receiver processing capacity may not be valid in practice, this assumption may be relaxed as discussed in the next section.

4.2 Reception Rate Estimation

When packets arrive at a rate higher than the receiver's processing capacity, the received data may be buffered at the receiver buffer awaiting processing. The lower buffer availability then may result in smaller reported AWnd. Thus, by monitoring the AWnd reported from the receiver, the accelerator may incorporate the receiver's processing capability into the system model described according to (3).

Specifically, let ai be the value of AWnd reported by ACK packet i. Then, the amount of data processed by the receiver between time ti and ti+k may be given by:

$$(a_{i+k} + n_{i+k}) - (a_i + n_i) \quad (4)$$

which is the difference in the acknowledged sequence number plus the difference in the reported AWnd. In case the receiver is slower than the incoming data rate, then ai+k may decrease, thus reducing the amount.

The reception rate, denoted by Ri, may then be computed from $$R_i = \frac{(a_{i+k} - a_i) + (n_{i+k} - n_i)}{t_{i+k} - t_i} \quad (5)$$

Similar to (3), the parameter k may control the width of the estimation interval. In various embodiments, exponentially weighted moving averaging may also be applied to (5), for example, to smooth out the random fluctuations and obtain the smoothed reception rate denoted by R. Note that if the receiver processing capacity is infinite, then ai+k=ai for all i and k, and (5) may reduce to the special case in (3). The estimated reception rate may incorporate the effect of both link bandwidth availability and receiver processing capacity. This may be used to schedule the forwarding of packets in the accelerator.

4.3 Transmission Scheduling

Armed with an estimate of the reception rate, transmission of packets from the accelerator to the receiver may be scheduled such that it may not cause buffer overflow at the receiver. The challenge is that the AWnd reported in a ACK packet may be delayed information—for example, it may be the receiver's buffer availability about 0.5rtt s ago. During the time the ACK takes to travel to the accelerator, additional TCP segments may arrive at the receiver, and the receiver application may also take out more data from the receive buffer.

Figure 7:
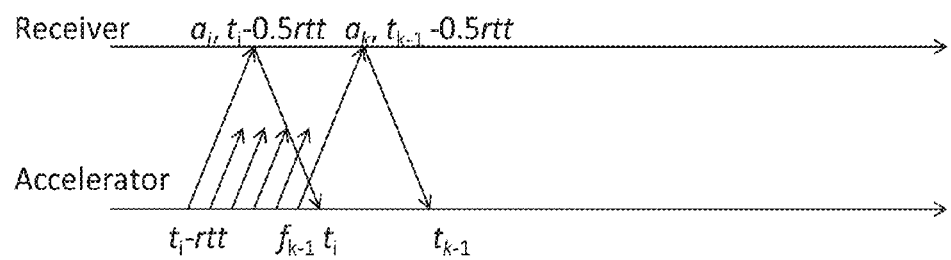
FIG. 7 shows a transmission timing diagram between receiver and accelerator according to various embodiments.

Considering the timing diagram in FIG. 7, in various embodiments, the minimum fk for the k-th packet may be found such that the expected buffer availability bk, when the k-th packet arrives at the receiver, is non-negative (i.e., no buffer overflow). fk may further be expressed as $$f_k = t_{now} + \nabla t_k \quad (6)$$

where tnow is the current time and Δtk is the delay in forwarding of the k-th packet.

Next, in various embodiments, the data arrives and departures may be considered between the time the last ACK was transmitted by the receiver, i.e., (ti−0.5rtt), and the time packet k arrives at the receiver, i.e., (fk+0.5rtt). First, during this time, the receiver may continue to process packets and free-up buffers at a rate of R. Thus, the expected amount of buffer space being freed up in this period, denoted by Dproc, may be given by $$D_{proc} = R(f_k + 0.5rtt - t_i + 0.5rtt) \quad (7)$$
$$= R(t_{now} + \nabla t_k - t_i + rtt)$$

Similarly, the expected amount of data arriving at the receiver during this period, denoted by Drecv, may be given by $$D_{recv} = \sum_{\forall j \mid (f_j > (t_i - rtt) \cap f_j \leq f_k)} \hat{a} \, q_j \quad (8)$$

Hence the buffer availability bk at time (fk+0.5rtt) may be computed from the buffer availability at the beginning of the period, for example, ai, plus the amount of buffer freed up, for example, Dproc, minus the amount of data arrivals, for example, Drecv:

$$b_k = \min\{a_i + D_{proc} - D_{recv}, a_{max}\} \quad (9)$$

$$= \min\left\{a_i + R(t_{now} + \Delta t_k + 0.5rtt - t_i + 0.5rtt) - \sum_{\forall j \mid (f_j > (t_i - rtt) \cap f_j \leq f_k)} q_j, a_{max}\right\}$$

-continued $$= \min\left\{a_i + R(t_{now} + \Delta t_k + rtt - t_i) - \sum_{\forall j | \{f_j > (t_i - rtt) \cap f_j \le f_k\}} q_j, a_{max}\right\}$$

where amax is the maximum AWnd of the receiver. Assuming bk<amax, then the packet forwarding delay may be computed from $$0 \le b_k \tag{10}$$

$$0 \le a_i + R(t_{now} + \Delta t_k + rtt - t_i) - \sum_{\forall j | \{f_j > (t_i - rtt) \cap f_j \le f_k\}} q_j$$

$$R \times \Delta t_k \ge \sum_{\forall j | \{f_j > (t_i - rtt) \cap f_j \le f_k\}} q_j - a_i - R(t_{now} + rtt - t_i)$$

$$\Delta t_k \ge \max\left(\frac{1}{R}\left(\sum_{\forall j | \{f_j > (t_i - rtt) \cap f_j \le f_k\}} q_j - a_i\right) - (t_{now} + rtt - t_i), 0\right)$$

$$(\because \Delta t_k \ge 0)$$

The accelerator may compute the packet forwarding time for each head-of-line packet in a TCP flow, and transmit them according to a round-robin scheduler in Chapter 7.

4.4 Performance

Figure 3:
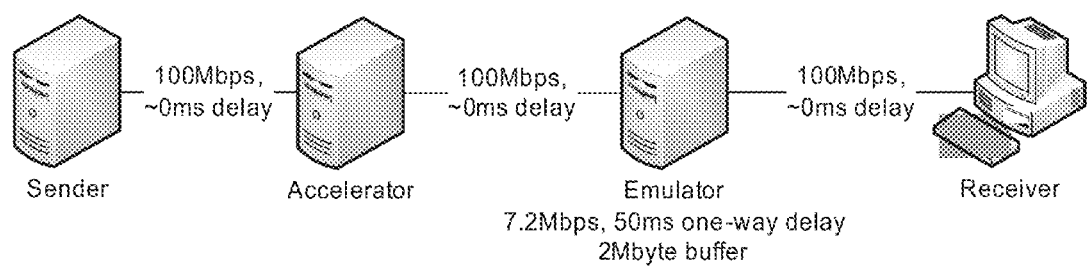
FIG. 3 shows an emulation platform according to various embodiments.

For example, to evaluate the performance of the developed estimation and scheduling algorithms, the experiment illustrated in FIG. 3 may be repeated. In various embodiments, the accelerator may be equipped with the reception rate estimation algorithm and schedule packet forwarding according to the transmission scheduler, for example, described in Section 4.3.

Figure 8:
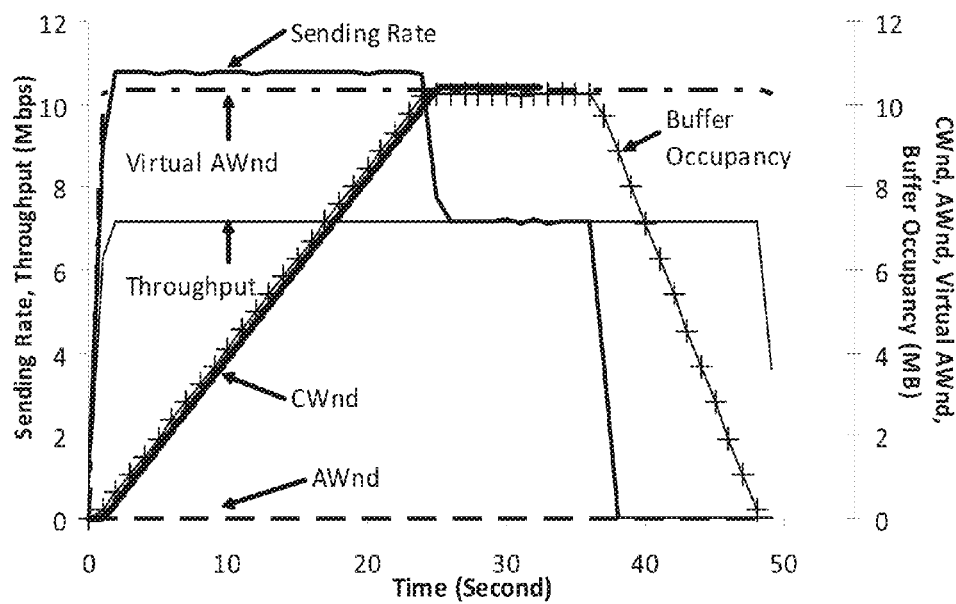
FIG. 8 shows the evolution of the AWnd, CWnd, Virtual AWnd, buffer occupancy, sending rate and throughput achieved with transmission scheduling, according to various embodiments.

FIG. 8 shows the evolution of the AWnd, CWnd, Virtual AWnd, buffer occupancy at accelerator, sending rate and the throughput achieved by the TCP flow, according to various embodiments. Unlike the previous experimental results in FIG. 5Error! Reference source not found., the bottleneck link may not be congested even though the sender's CWnd grows to very large value (up to about 10 MB). As a result, the TCP throughput may reach and sustain at the link's capacity limit. Note that the initial sending rate may be higher than the TCP throughput as the accelerator reports its own buffer availability in the AWnd sent back to the sender. Once the accelerator buffer becomes full, for example, around 25 seconds, the AWnd may realize flow control between the sender and the accelerator, of which the sender quickly reduces its sending rate to the TCP throughput. Compared to the case without the accelerator, the achievable throughput (payload only) may be increased from 1.34 Mbps to 6.71 Mbps.

Nevertheless, unlike wired networks where packet losses are primarily due to congestion, our measurements show that mobile data networks do exhibit random packet losses which may not be related to congestion. Thus, although the transmission scheduler may prevent congestion-induced packet losses, the occurrences of random packet loss may still degrade TCP's throughput performance. Loss recovery is discussed in detail in the next chapter.

Chapter 5: Local Retransmission

Figure 9:
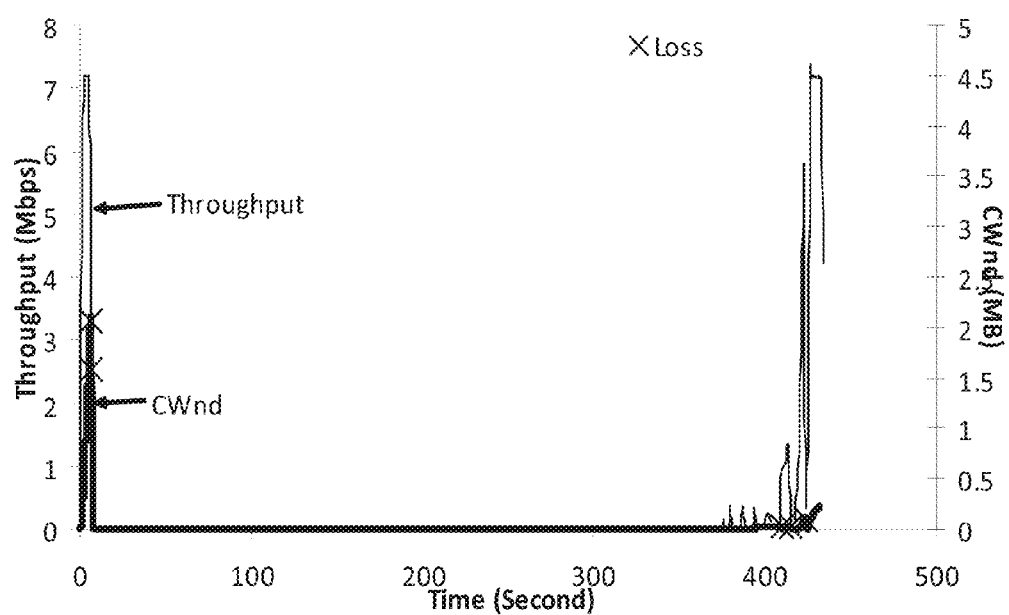
FIG. 9 shows the dynamic of CWnd and throughput in the present of packet loss according to various embodiments of the invention.

As shown in Chapter 4, the introduction of a virtual AWnd, which may be purposely made larger than the actual receiver AWnd, may lead to large packet loss bursts which may in turn blackout the throughput performance for hundreds of seconds (c.f. FIG. 9). The transmission scheduler in Chapter 4 may prevent loss induced by congestion but experiments according to various embodiments reveal that even a very low level of residual packet loss may still cause the blackout phenomena. Various embodiments are proposed in this Chapter to develop a new local retransmission algorithm, for example, to tackle this burst-loss problem so that the throughput of the TCP flow may be maintained in the event of packet loss.

5.1 The Blackout Period

To illustrate the problem, an experiment is conducted using the same network topology as in FIG. 3. The accelerator may implement the transmission scheduler, for example, to prevent network congestion from occurring. The network emulator is configured, for example, to introduce random loss at about 0.01%. For ordinary TCP packet, loss at this low loss rate may not cause significant throughput degradation as such losses may be readily recovered via TCP's fast retransmit algorithm.

By contrast, as shown in FIG. 9 which shows the evolution of the CWnd versus time, the accelerated TCP flow may suffer from the same blackout period as reported in Chapter 4, even if there are only two packet losses before the blackout period begins. The blackout period may continue for over about 400 seconds while the sender repeatedly timeout and retransmit lost packets, for example, one at a time, to the receiver.

In various embodiments, measurements of production 3G HSPA networks reveal that the loss rate may not be zero even at low data rate. Table 1 summarizes the loss rate for sending UDP data in about 1 KB datagram size to a mobile receiver at data rates ranging from about 1 to 7 Mbps. The 3G HSPA network and the 3G modem may have a maximum bandwidth of about 7.2 Mbps. It is clear from this result that even at the lowest data rate of about 1 Mbps, some packet losses may remain. Analysis of the traffic trace data suggests that these packet losses may be unlikely to be caused due to congestion.

To understand the cause for the blackout period, for example, the packet exchanges between the sender and the receiver in FIG. 1 may be traced. The accelerator in-between may simply forward packets between the sender and receiver, except for rewriting the AWnd field in ACKs sent by the receiver to a large value (e.g., about 10 MB). At the beginning of Phase I, the receiver buffer may be empty as it is assumed that it takes zero time to process the incoming packet and passes the data to the receiver application. Now suppose packet i is lost. Then, while packets i+1, i+2, etc., arrive at the receiver successfully, they may not be passed to the application as packet i has not been received. Instead, in one embodiment, the subsequent packets may be buffered up until the buffer is full when packet j (j>i) arrives as illustrated in Phase II (the second grouped portion from the top) of FIG. 1. In this case, the receiver may discard packet j and all subsequent packets as well.

Eventually, the sender may use up the CWnd, say, after packet k−1 (assuming k>j+1) is transmitted and then it may halt transmission. Meanwhile, when three duplicate ACKs for packet i are received, the sender may trigger fast retransmit by retransmitting packet i and decreasing the CWnd (e.g., to half in Reno). Suppose the retransmission is successful, then the ACK for packet j (i.e., the last buffered packet) may return to the sender at the end of Phase II. At the receiver side, all the buffered data may now be passed to the application, thus freeing up the receiver buffer.

Figure 10:
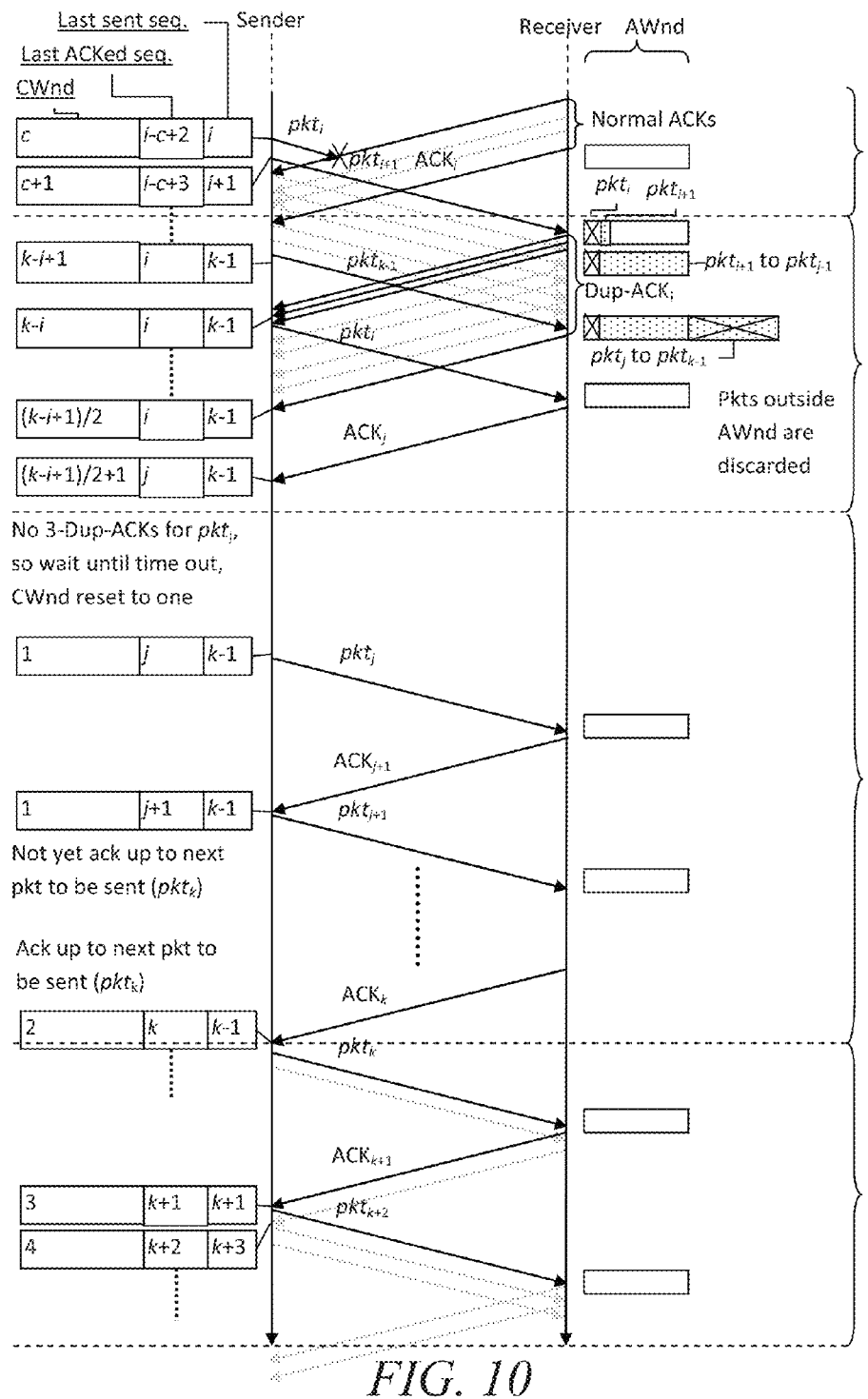
FIG. 10 illustrates the slow recovery of discarded packets caused by disabling flow control, according to various embodiments of the invention.

In various embodiments, the blackout period may begin in Phase III (the third grouped portion from the top) of FIG. 10. Here, the sender may not be able to transmit any packet as the CWnd has already been used up. Note that receiving the ACK for packet j may not relieve this condition as long as:

$$(k-1)-j+1 \geq (k-i+1)/2 \qquad (9)$$

for the case of Reno. Similar conditions may be derived for other TCP variants such as CUBIC. In any case, this condition may be due to two factors: (a) the reduction of CWnd in fast retransmit; and (b) the transmission of packets beyond the actual AWnd (i.e., packet j to k−1).

The sender in this case may wait until the RTO for packet j expires, at which time it may retransmit packet j and reset the CWnd to 1. By the time the ACK returns, the RTO for packet j+1 may be likely to have expired as well and so the sender may retransmit packet j+1, and the process may repeat. During Phase III, the sender may effectively transmit just one packet per RTT, resulting in the long stretch of very low throughput observed in FIG. 9. Eventually, all the lost packets up to packet k−1 may be successfully retransmitted and then the sender may begin slow-start again in Phase IV (the fourth grouped portion from the top) of FIG. 1. Note that this blackout behavior may occur because the accelerator sends packets beyond the receiver's AWnD. It is verified via experiments that the same behavior does not occur in ordinary TCP, even when a large burst of consecutive packets are dropped.

Therefore, while rewriting the AWnd eliminates the throughput limit constrained by AWnd, it may introduce a new problem in packet loss recovery. Various embodiments are proposed to tackle this problem, for example, by developing a new predictive retransmission algorithm in the next section.

TABLE 1

Average loss ratio at various sending rate

| Sending rate (Mbps) | 1 | 2 | 3 | 4 | 5 | 6 | 7 |
|---|---|---|---|---|---|---|---|
| Loss ratio | 0.01 | 0.01 | 0.01 | 0.04 | 0.21 | 0.33 | 0.47 |

5.2 Proactive Retransmission

Local retransmission has previously been proposed to handle random loss in wireless networks. The principle is to buffer unacknowledged packets in the intermediate gateway so that it can retransmit lost packets on behalf of the sender to suppress duplicate ACKs from triggering congestion control at the sender.

In various embodiments, local retransmission may be extended to tackle the blackout problem. Referring to FIG. 1, it is noted that when packet i is lost, all the out-of-window packets from packet j to k−1 may be discarded by the receiver. As the accelerator knows the actual AWnd reported by the receiver, it may compute j from $$j = i + AWnd \qquad (10)$$

Figure 11:
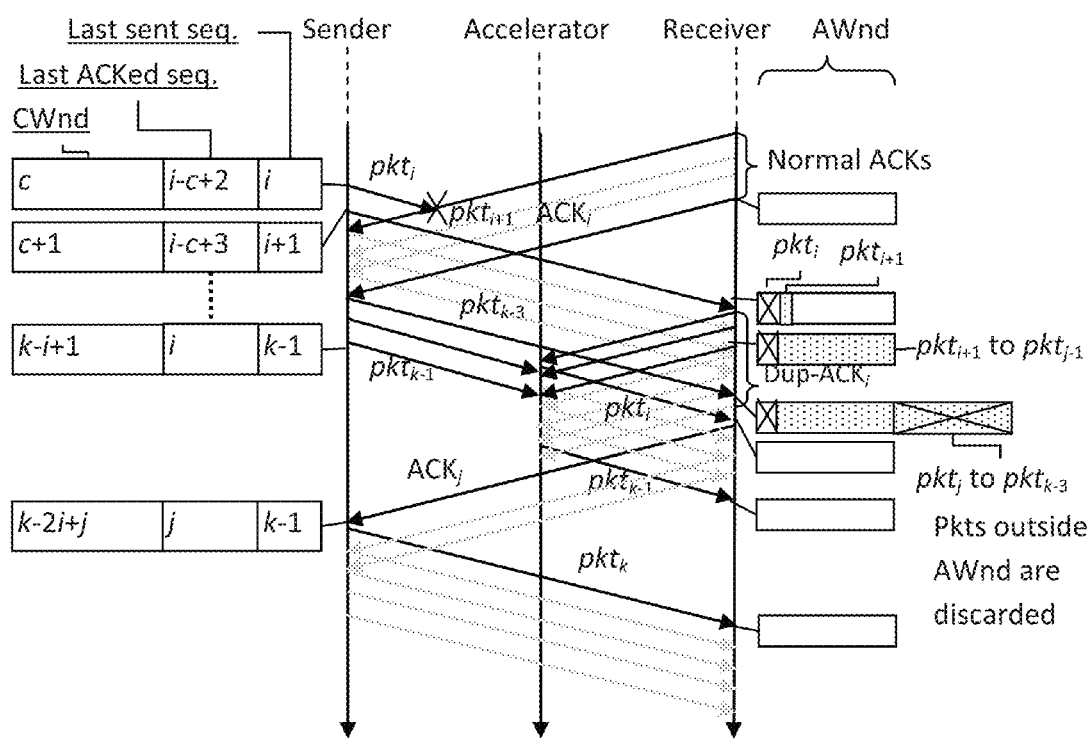
FIG. 11 shows how proactive retransmission works according to various embodiments.

Thus, instead of waiting for the sender to timeout and retransmit packet j, the accelerator may simply retransmit packets j to k−1 after retransmitting packet i. FIG. 11 illustrates this proactive retransmission algorithm according to various embodiments using the same scenario in FIG. 1. The pseudo-code for the algorithm according to various embodiments is listed in FIG. 12. Note that the retransmitted packets may also be subject to the transmission scheduling described in Section 4.3, for example, to prevent a large burst of retransmitted packets from congesting the network. In case the receiver supports TCP SACK, in various embodiments, the accelerator may also scan through the SACK list and retransmit the missing packets within the AWnd.

In various embodiments, the accelerator may suppress the duplicate ACK (i.e., not forwarding it to the sender) if it can retransmit the packet. This may prevent the sender from triggering its congestion control algorithm. On the other hand, if the packet is lost before it reaches the accelerator, then the duplicate ACK may be forwarded to the sender as the accelerator cannot retransmit a packet never received. This may also preserve TCP's congestion control of the path between the sender and the accelerator.

5.3 Performance

Figure 13:
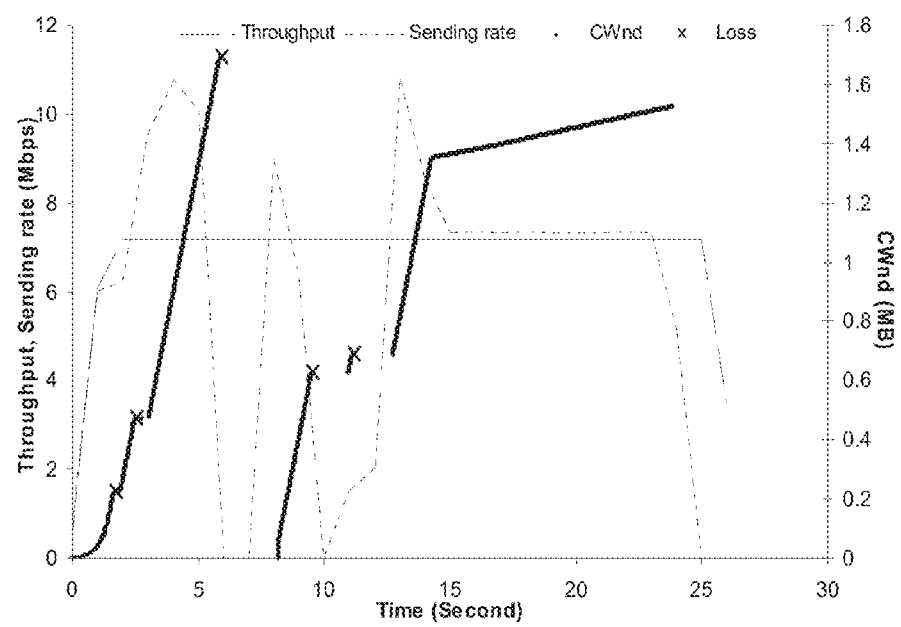
FIG. 13 shows the evolution of CWnd, throughput and sending rate with proactive retransmission according to various embodiments.

The experiment may be repeated using the setup in Error! Reference source not found.FIG. 3 with local retransmission implemented at the accelerator. FIG. 13 shows the evolution of CWnd, throughput, and the sender's sending rate versus time according to various embodiments. Firstly, it is observed that the two packet losses within the first 5 seconds do not cause the sender to reduce its CWnd. This is because the loss events may be successfully suppressed by the accelerator.

However, the third packet loss may result in sender timeout, despite that the lost packet may be successfully retransmitted by the accelerator. This is because the extra delay incurred by local retransmission may delay the ACK so much that it may exceed the RTO of the sender. This shows that local retransmission alone may not be able to suppress all loss events. Various embodiments are proposed to develop a novel RTT modulation technique in the next section, for example, to tackle this problem.

Chapter 6: Loss Event Suppression

A fundamental limitation of local retransmission is that the lost packet may not be retransmitted and the corresponding ACK received in time to prevent the sender from timeout. Once timeout occurs, the TCP flow's throughput will decrease significantly as the CWnd is reset to one. One solution to this problem is to split the TCP flow into two, one between the sender and the accelerator and the other between the accelerator and the receiver. This split-TCP approach decouples loss recovery between the sender and the receiver by generating ACKs independently of the receiver. Specifically, a split-TCP gateway will return ACKs to the sender as if it is the receiver. The received packets are then forwarded to the receiver in a separate TCP connection. Thus, loss events between the gateway and the receiver are handled completely by the gateway, without involving the sender at all. This prevents the sender from triggering its congestion control algorithm.

However the split-TCP approach suffers from a tradeoff—it breaks the reliable service guarantee provided by TCP. In particular, it is possible for a packet to be acknowledged by the gateway but ultimately fail to be delivered to the receiver (e.g., the network link goes down before the gateway can forward the packet to the receiver). In this case, the sender and the receiver may be in an inconsistent state, i.e., the sender assumes successful delivery of a packet which is in fact not received by the receiver.

To avoid this problem, a novel RTT modulation mechanism according to various embodiments are proposed to enable the suppression of loss events without the need for splitting the TCP flow.

6.1 RTT Modulation

The challenge in retransmitting lost packet locally by the accelerator is the time needed for the retransmissions. In particular, if the retransmission cannot be done so that the ACK can reach the sender before it times out, congestion control may kick in to reduce the sender's transmission rate significantly (for example, by reducing CWnd to 1 and then restart from slow-start again). Specifically, TCP may set its timeout threshold, denoted by RTO, according to:

$$rto = srtt + 4 \cdot rtt_{dev} \qquad (11)$$

where srtt is the smoothed RTT and rttdev is the smoothed mean deviation of RTT. Thus, to avoid timeout, the ACK may arrive at the sender no later than the average RTT plus four times the mean RTT deviation.

Figure 14:
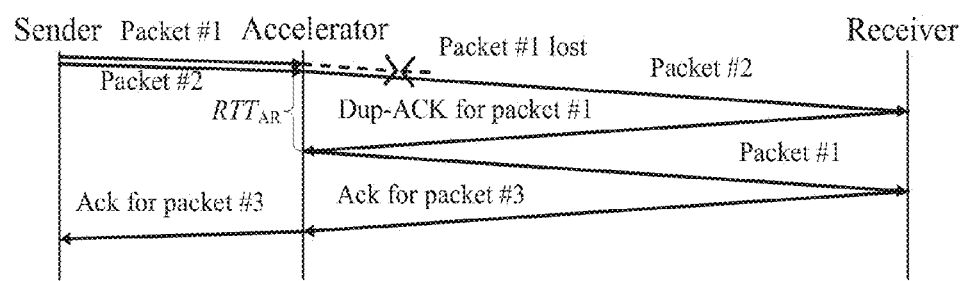
FIG. 14 shows the RTT incurred by local retransmission according to various embodiments.

Considering the scenario in FIG. 14, let RTTSR, RTTSA, RTTAR be the RTT between sender and receiver, sender and accelerator and accelerator and receiver, respectively. Normally RTTSR is the sum of RTTSA and RTTAR. However, once local retransmission takes place, measured RTT of the lost packet may increase to RTTSA+2RTTAR. Depending on the extent of RTT variation of the mobile data network, the extra delay RTTAR may be larger than four times the mean deviation of the RTT as measured by the sender.

In various embodiments, measurement of a production 3G HSPA network recorded a mean RTT deviation at around 7 ms while the mean RTTAR is around 100 ms. Thus, in this case even the packet can be successfully retransmitted in one attempt, the extra delay incurred (i.e., 100 ms) may still trigger timeout at the sender, leading to a significant drop in the sender's CWnd.

Now, the time needed for retransmission may depend on a number of factors, including the RTT between the accelerator and the receiver, transmission time, and accelerator processing time. The first two of these factors may be network dependent and thus may not be reduced further by the transport layer. On the other hand, it is noted that the timeout threshold at the sender may be continuously updated through measurement of the average RTT and mean RTT deviation between the sender and the receiver whenever an ACK comes back.

In (11), it is noted that srtt may be computed from measured RTT, which may be in turn computed from the difference between the ACK packet arrival time and the transmission time of the original data packet. While the way the sender computes the srtt may not be changed, the accelerator may change the RTT as measured by the sender, simply by delaying the forwarding of ACK packets received from the receiver—RTT modulation.

The next question may be the amount of delay to add. Intuitively, a longer delay may allow more time to carry out local retransmission. However, if the delay is too long, then it may exceed the RTO threshold at the beginning of the connection, resulting in false triggering of timeout. Moreover, a long RTT may also lower the rate at which the sender ramps up the CWnd, thus degrading throughput at the beginning.

To tackle this dilemma, various embodiments are proposed to increase the forwarding delay in an incrementally manner. Specifically, the accelerator may continuously measure the RTT deviation between the accelerator and the receiver by $$rtt_{drv\_i} = |rtt_i - srtt| \qquad (12)$$

and then compute the smoothed mean RTT deviation from $$rtt_{dev} = \frac{3}{4} rtt_{dev} + \frac{1}{4} rtt_{dev\_i} \qquad (13)$$

Although the measurement does not include the delay and delay variations between the sender and the accelerator, the impact is generally insignificant as (a) the mobile link typically exhibits larger RTT and RTT variations than the wired link; and (b) RTT variations of the wired link is generally independent of the RTT variations of the mobile link. Thus, in general, the mean RTT deviation measured by the sender may not be smaller than the mean RTT deviation of the mobile link.

Define L to be the number of retransmission attempts to accommodate. Then, an ACK-forwarding delay, denoted by D, may be added such that $$D \geq L \times rtt \qquad (14)$$

where rtt is the smoothed RTT between the accelerator and the receiver.

Denote the initial ACK-forwarding delay as D0=0. Then whenever an ACK arrives at the accelerator, it will increase the ACK-forwarding delay by $$D_{i+1} = D_i + \beta \times rtt_{dev} \qquad (15)$$

where rttdev is the smoothed mean RTT deviation between the accelerator and the receiver. The parameter β controls how fast the ACK-forwarding delay may be increased. An obvious limit is β<4 as the sender RTO may expire if the ACK arrives 4 times the smoothed mean RTT deviation later than the mean RTT.

6.2 Performance

Figure 15:
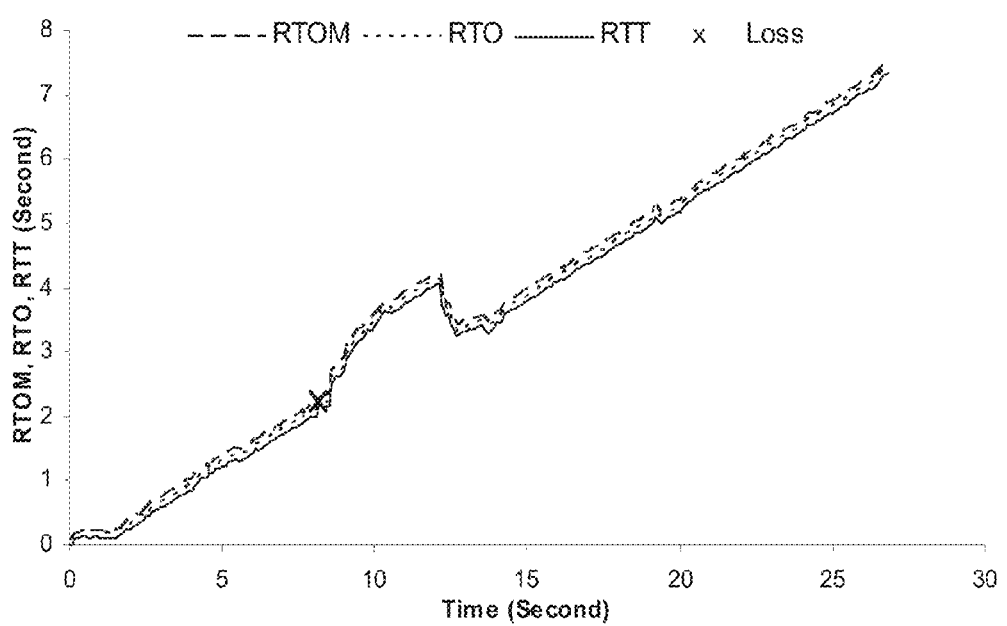
FIG. 15 shows the evolution of modulated RTO (RTOM), RTO and RTT versus time according to various embodiments.
Figure 16:
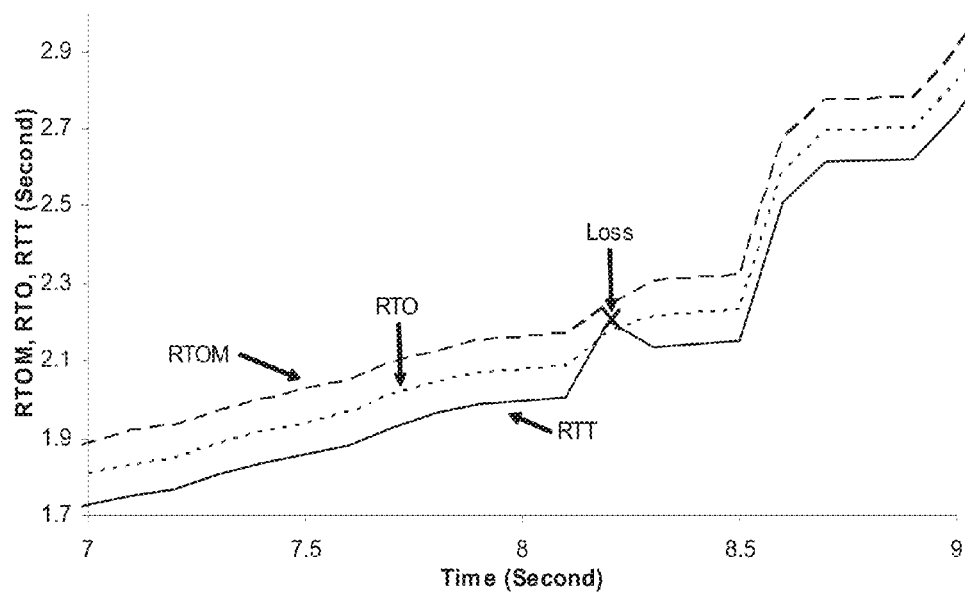
FIG. 16 shows the evolution of modulated RTO (RTOM), RTO and RTT versus time (enlarged around loss) according to various embodiments.

To evaluate the performance of RTT modulation, in various embodiments, the experiment may be repeated using the setup in FIG. 3, for example, by implementing the transmission scheduler, proactive retransmission, and RTT modulation algorithms in the accelerator. In one embodiment, it may be set that β=2 in (15). Error! Reference source not found.FIG. 15 shows the evolution of modulated RTO (RTOM), RTO and RTT versus time according to various embodiments. Random packet loss occurred at 8.21 s. Error! Reference source not found.in FIG. 16 shows an enlarged view of FIG. 15 around the time the loss event occurred according to various embodiments. As the lost packet was retransmitted by the accelerator, the RTT of the locally retransmitted packet is increased beyond the original RTO. Thus, without RTT modulation, this may trigger sender timeout. By contrast, modulated RTT may allow the extra margin for the local retransmission to complete, and in this case the increased RTT may stay within the modulated RTT and thus the loss event may be successfully suppressed.

Chapter 7: Fairness

Congestion control between the accelerator and the receiver may no longer follow the conventional TCP AIMD algorithm. In a mobile data network, although network channel resources are allocated in a per-device basis, TCP flows destined to the same receiver may still compete against each other for bandwidth. In various embodiments, the mobile data network may also be shared by multiple hosts using an NAT. In this case, TCP flows destined to all hosts connected via the same mobile data link may compete against each other for bandwidth. In this chapter, the bandwidth sharing behavior of conventional TCP and that of the accelerator according to various embodiments are discussed in detail.

7.1 Packet Forwarding

Figure 17:
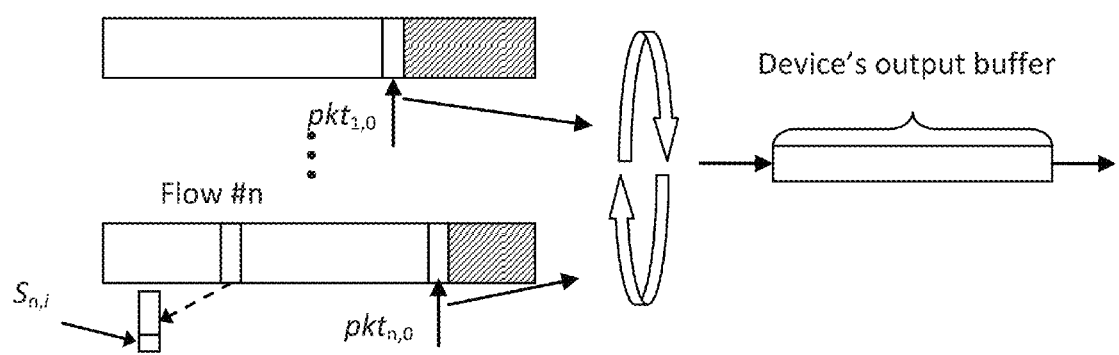
FIG. 17 shows the logic of packet scheduling according to various embodiments.

In some embodiment, the accelerator may allocate channel resources in a round robin manner as illustrated in FIG. 17 for TCP flows destined towards the same receiver. Specifically, packets may be organized in per-flow queues awaiting forwarding to the receiver. Each packet may have a scheduled forwarding time as determined by the transmission scheduler (c.f. Section 4.3). The accelerator may iterate through all queues in a round-robin manner. Empty queues may be skipped. Otherwise, the scheduled forwarding time of the queue's head-of-line packet may be compared against the current time, and the packet may be forwarded if the scheduled forwarding time is up. Otherwise, the queue is skipped.

To evaluate this component, in various embodiments, two connections transferring about 16 MByte of data may be used while one of the connections may start 5 seconds earlier than another one such that the earlier link can achieve its maximum throughput and let the latter one compete with it. In various embodiments, for the case of not using the accelerator, the receiver buffer size may be manually set to be about 128 KB (which is larger than the BDP of the emulated link at about 108 KB), and random loss may be set to be zero to ensure that the two ordinary TCP connections (using Linux's default CUBIC congestion module) can fully utilize the link capacity.

Figure 18:
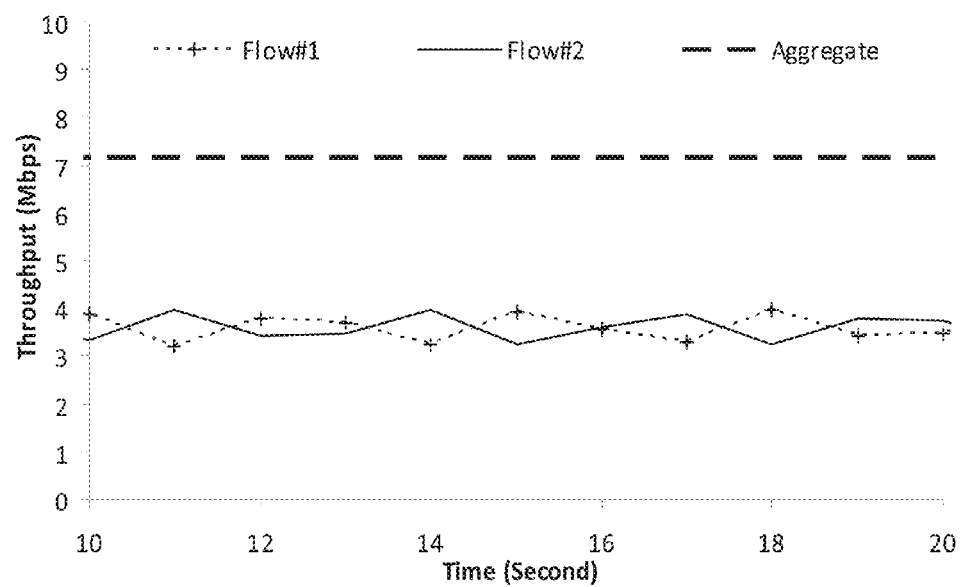
FIG. 18 shows throughput variation of two competing flows without accelerator according to various embodiments.
Figure 19:
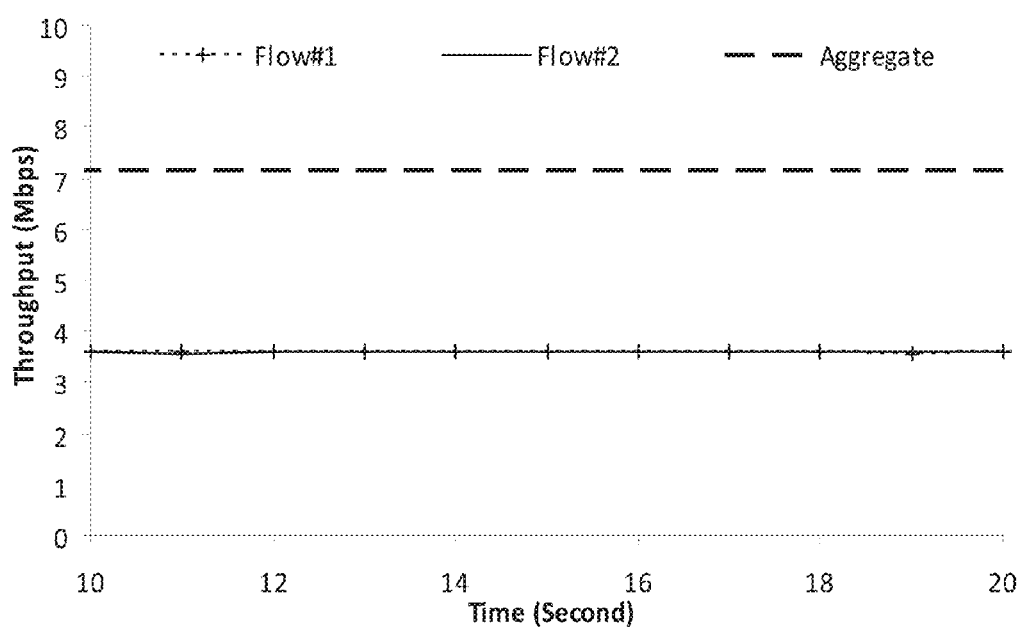
FIG. 19 shows throughput variation of two competing flows with accelerator according to various embodiments.

FIG. 18 and FIG. 19 show the 1-s averaged throughout of the two TCP flows for the case without and with accelerator, respectively, according to various embodiment. In one embodiment, the throughput may be measured at the receiver. It is observed that normal TCP flows without the accelerator exhibit more throughput fluctuations than the case with the accelerator. The throughput fluctuations may be due to the bandwidth probing actions of the two TCP flows. By contrast, the accelerator's round-robin scheduler may allocate near equal bandwidth to the two competing TCP flows with negligible fluctuations.

Figure 20:
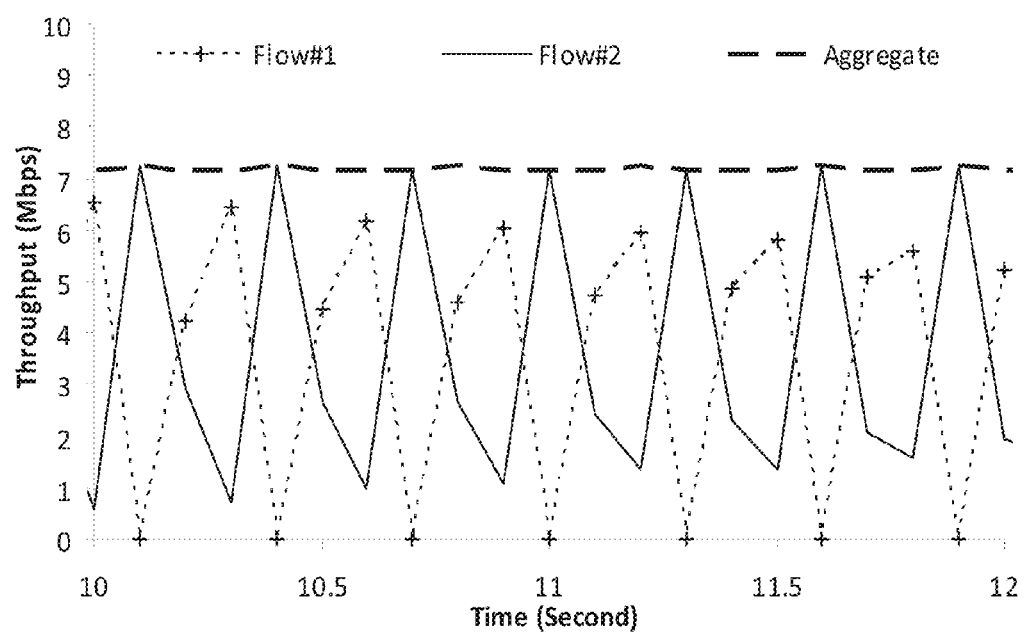
FIG. 20 shows throughput variation of two competing flows without accelerator according to various embodiments.
Figure 21:
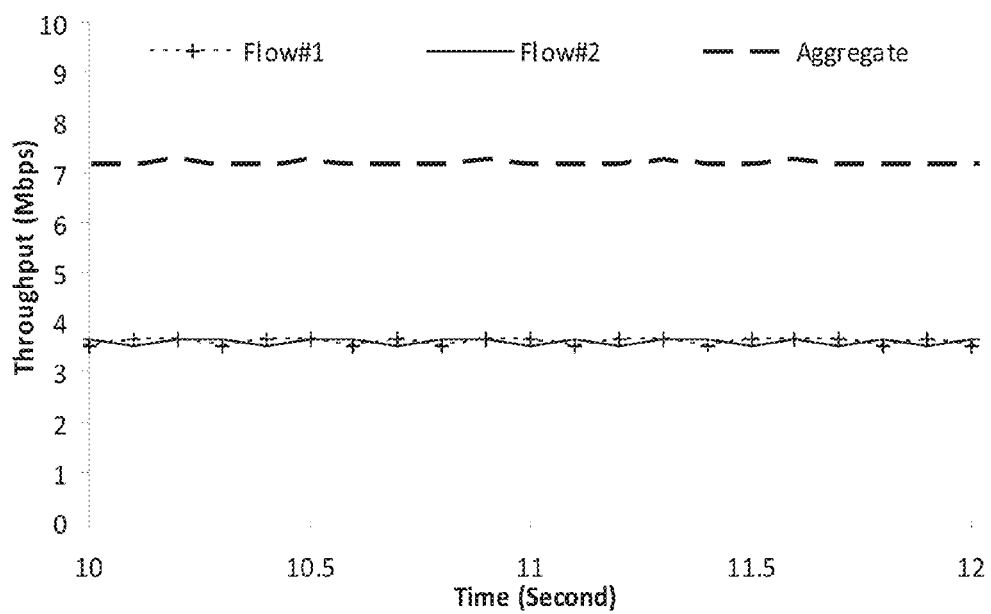
FIG. 21 shows throughput variation of two competing flows with accelerator according to various embodiments.

The differences may widen even further if the throughput is averaged over a shorter timescale, e.g., about 100 ms in FIG. 20 and FIG. 21. In terms of fairness, in various embodiments, Jain's fairness index may be employed to quantify the comparisons. The fairness index may range from 1/n to 1 where n is the number of competing flows. Larger index value may represent, for example, better fairness among the competing TCP flows. Table 4 lists the fairness indices for three timescales, i.e., about 1000 ms, 100 ms, and 10 ms. It is noted that the accelerator may maintain a high fairness index even for timescale as short as about 10 ms, at which point normal TCP performs poorly. These results demonstrate that although the accelerator does not implement TCP's AIMD congestion control algorithm, it nevertheless may achieve even better fairness in bandwidth sharing.

TABLE 2

Jian's fairness index with different scale

| Scales | 1000 ms | 100 ms | 10 ms |
|---|---|---|---|
| Normal TCP | 0.95 | 0.76 | 0.82 |
| Using accelerator | 0.95 | 0.98 | 0.99 |

7.2 Non-Uniform Bandwidth Allocation

Figure 22:
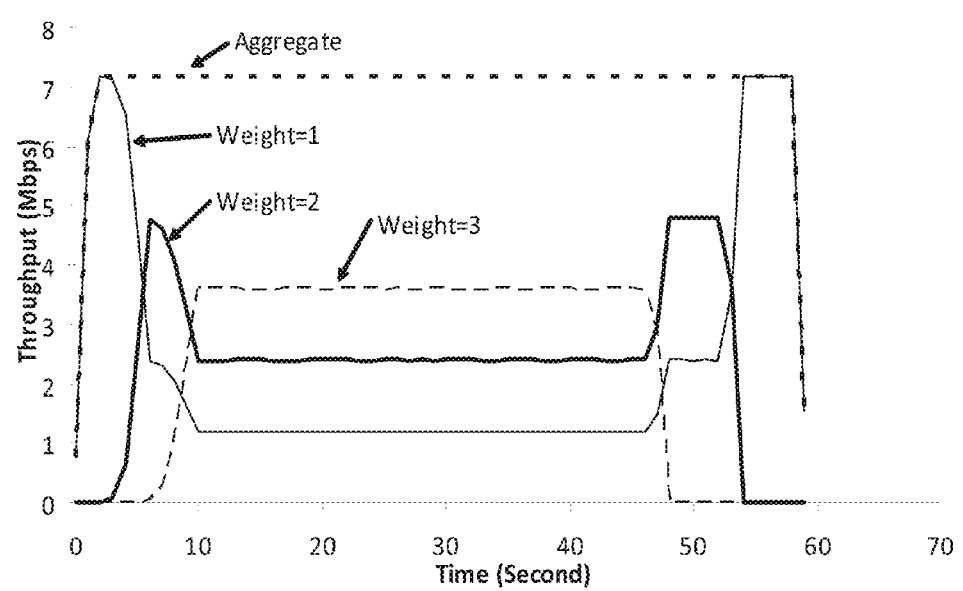
FIG. 22 shows throughput variation of flows with different weight according to various embodiments.

In addition to round-robin scheduling, in various embodiments, the accelerator may open the door to implement more sophisticated bandwidth allocation and channel scheduling algorithms. As an example, in one embodiment, a generalized queuing discipline called weight fair queuing (WFQ) may be implemented. Each TCP flow may be assigned a weight, denoted by wi for flow i. In each round of packet forwarding, up to wi packets may be forwarded for flow i. This may result in unequal throughput with the flows throughputs approximating the ratios of the weights. FIG. 22 shows the throughput of 3 TCP flows with weights w0=1, w1=2, and w2=3, respectively, according to various embodiments. Considering the stationary period from time about 20 to 40 seconds, the resultant throughput ratios may be 1:2.0001:3.0003, which closely approximate the assigned weights.

WFQ may be applied in many ways, such as to provide different bandwidth to different applications (e.g., more bandwidth for web browsing versus P2P), or to adapt the bandwidth allocation based on application demands (e.g., video streaming versus file download), and so on.

Chapter 8: Experiments

In various embodiments, extensive measurements and experiments may be conducted with respect to a production 3G HSPA network, for example, to evaluate the characteristics of mobile data networks, to study the performance of TCP, and to evaluate the performance of the proposed accelerator.

8.1 Experiment Setup

Figure 23:
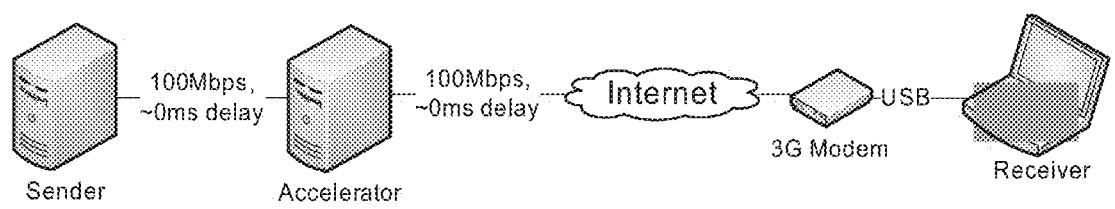
FIG. 23 shows a practical network setup according to various embodiments.

FIG. 23 illustrates the experiment setup according to various embodiments. In one embodiment, the sender and the accelerator both may run on Linux with kernel 2.6 (with CUBIC as the TCP congestion control module). They may connect to the Internet via high-speed wired network links running at about 100 Mbps. The receiver host may run Windows XP SP2 and be connected to the mobile data network via a USB 3G HSPA modem. All experiments may be conducted with the receiving host in a stationary position.

8.2 Packet Loss

Figure 24:
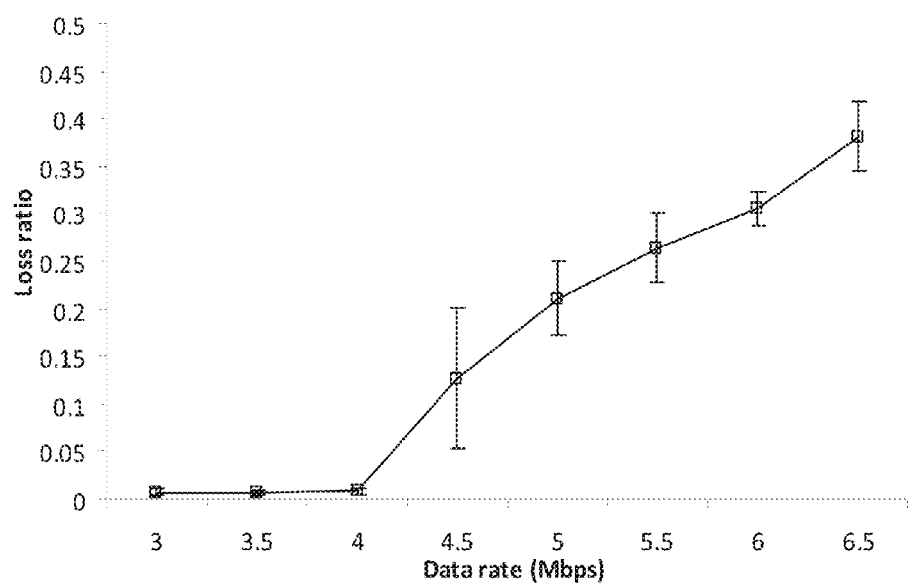
FIG. 24 shows loss ratio with 95% confidence interval for data rates of 3-6.5 Mbps according to various embodiments.

In various embodiments, the packet loss rate of the mobile link may be studied by sending UDP datagrams directly from the sender to the receiver, bypassing the accelerator, at various fixed rates ranging from about 3 to 6.5 Mbps. FIG. 24 shows the packet loss ratio with 95% confidence interval versus various UDP data rates according to various embodiments. The measurement shows that the mobile link may have an upper throughput limit at approximately 5.40 Mbps. Nevertheless, as the results in FIG. 24 show, the packet loss ratio may be significant even at data rates lower than the mobile link's throughout limit. Moreover, the results consistently show that the loss rates may be data rate dependent—higher data rate generally results in higher packet loss ratio.

A second observation is that packet loss may remain even if the data rate is low. For example, in one embodiment, at a data rate of about 3 Mbps, a loss rate of approximately 0.6% may be consistently measured. These losses may be due to radio transmission errors which may not be recovered by the link layer's retransmission mechanism such as HARQ.

It is also worth noting that the extent of packet losses may depend on many factors, such as the location of the mobile device, mobility of the mobile device, amount of radio interference, etc. In various embodiments, similar measurements may also be conducted with respect to other mobile data networks and different levels (higher) of packet losses may be found. Nevertheless, the previous two observations according to various embodiments are consistent even across different mobile operators.

8.3 Unaccelerated TCP Throughput

The throughput performance of normal TCP over the mobile data network may be evaluated. In addition to using the default receiver window size, which is about 17 KB for Microsoft® Windows® XP®, a custom application according to various embodiments may explicitly increase the receiver window size by increasing the socket buffer size via the sockets API.

Figure 25:
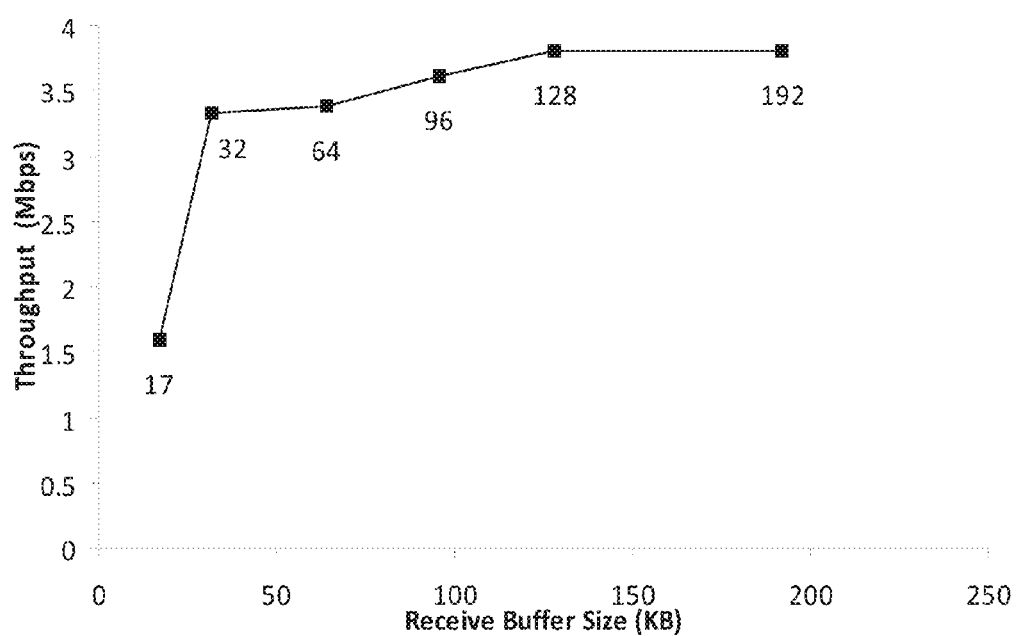
FIG. 25 shows achievable throughput versus various receive buffer size according to various embodiments.

FIG. 25 shows the achievable TCP throughput versus receiver buffer size ranging from about 17 KB to about 128 KB according to various embodiments. The BDP of the path may be approximately 90 KB and thus the 128 KB and the 192 KB settings already exceeded the BDP. Not surprisingly, the throughput may increase with larger receiver buffer size. However, it is noted that even with a receiver buffer size of about 192 KB, the achievable throughput may be still lower than the throughput limit of about 5.40 Mbps as measured using UDP in Section 8.2.

8.4 Accelerated TCP Throughput

Next, in various embodiments, the throughput test may be repeated by introducing the accelerator between the sender and the receiver. The receiver in this case may employ the default receiver buffer size of about 17 KB. The test may be set to transfer a file of about 32 MB from the sender to the receiver.

Table 3 summarizes the overall throughput and steady state throughput for both accelerated and unaccelerated cases according to various embodiments. The former may include the ramp-up period of TCP while the latter may not. In either case, the accelerator may increase the achievable throughput by approximately 2.5 times. Moreover, the accelerated TCP may achieve a throughput (about 4.03 Mbps) higher than the case for normal TCP with about 192 KB receiver buffer size (3.80 Mbps). This is because the accelerator may not only eliminate the AWnd-induced bottleneck, but also suppress packet loss events, for example, to keep the sender CWnd at a high level.

TABLE 3

Improvement in both overall throughput and steady state throughput

|  | Overall Throughput (bps) | Steady State Throughput (bps) |
| --- | --- | --- |
| Without Accelerator | 1617918.03 | 1696274.89 |
| With Accelerator | 4033170.61 | 4255799.80 |
| Ratio (With/Without) | 2.49 | 2.51 |

8.5 Fairness

In various embodiments, for example, to evaluate the fairness in bandwidth sharing across competing TCP flows, two concurrent TCP connections may be initiated between the sender and the receiver, both transferring data as fast as TCP allows. For the unaccelerated case, the receiver window size may be explicitly set to be about 128 KB while the default window size may be set to be about 17 KB for the accelerated case.

In various embodiments, the throughput of the two TCP flows at the receiver may be captured and measured, and then the Jain's fairness index may be computed using throughput data averaged over about 100 ms intervals. The resultant fairness indices may be about 0.74 and 0.99 for the unaccelerated and accelerated cases, respectively. Consistent with the results in Section 7.1, the accelerator may achieve much better fairness in sharing bandwidth across the competing TCP flows.

8.6 Mobile Handset Performance

In various embodiments, the experiment setup may be changed to replace the PC-based receiver host by a mobile handset. For example, in one embodiment, three mobile handsets may be tested: iPhone 3G, iPhone 3GS, and Nexus One. All three mobile handsets may have built-in support for 3G HSPA. Throughput may be measured by downloading a 4 MB image file from a web server running in the sender host. Table 4 shows a summary of measured throughput according to various embodiments.

TABLE 4

Throughput obtained with handsets with and without the accelerator

|  | Without accelerator | With accelerator |
| --- | --- | --- |
| iPhone 3G throughput (Mbps) | 2.50 | 2.6 |
| iPhone 3GS throughput (Mbps) | 3.56 | 3.69 |
| Nexus One throughput (Mbps) | 2.93 | 4.02 |

From the packet trace data, it is observed that both iPhone® 3G and iPhone® 3GS may have a fixed receiver buffer size of about 128 KB while Nexus® One may implement adaptive buffer sizing, with a dynamically variable receiver buffer size up to about 81 KB.

As shown in Table 4, in various embodiments, for iPhone® 3G and iPhone® 3GS, the accelerator may not offer significant improvement in TCP throughput. Analysis of the traffic trace data reveals that the RTT measured by the sender may be about 400 ms. However, if the mobile handset is replaced by a PC-based receiver, the measured RTT may be only about 120 ms at the same data rate. As the same mobile data network is used in both cases, the differences in RTT may be due to processing delays incurred by the mobile handsets. In other words, in the cases of iPhone® 3G and iPhone® 3GS, the achievable throughput may be in fact limited by the processing capacity of the receiver. It is worth nothing that this capacity limit may be incorporated into the accelerator's transmission scheduler and thus even without TCP's AIMD congestion control, the accelerator may still correctly estimate the receiver's processing capacity and achieved its throughput limit.

For the Nexus One, in one embodiment, the accelerator may increase the achievable throughput from about 2.93 Mbps to about 4.02 Mbps. This suggests that the Nexus One may have a higher processing capacity which allows, for example, the accelerated TCP flow to reach a higher throughput.

Chapter 9: Additional Embodiments

In this chapter, three directions are discussed for various embodiments: (a) dynamic AWnd control; (b) split-TCP; (c) dynamic resource allocation; and (d) sender-based acceleration.

9.1 Dynamic AWnd Control

In the proposed opportunistic transmission, the AWnd may be rewritten with a large constant (e.g., about 10 MB) by the accelerator before it is forwarded to the sender. On one hand, while the constant AWnd may work well in the 3G HSPA environment, it may not be large enough for networks with even higher bandwidth. On the other hand, the accelerator may reserve buffer space of size AWnd bytes. If an accelerator needs to handle about 10K flows, then the buffer requirement alone may become about 100 GB, which may not be cost-effective.

Therefore one direction may be to investigate adaptive algorithms to monitor and estimate the throughput of on-going TCP flows and then dynamically adjust the AWnd to reduce buffer consumption, while still ensuring data may always be available for forwarding to the receiver. Moreover, buffer sharing techniques may also provide further reduction in buffer requirement, especially for flows destined to the same receiver.

9.2 Split-TCP

In various embodiments, the accelerator may maintain TCP's end-to-end performance guarantees such that data acknowledged are guaranteed to be received by the receiver.

This is useful in many applications, including finance, trading, e-banking, e-healthcare, and so on. Nevertheless, if split-TCP is to be applied, e.g., for non-critical applications, the accelerator may then further modify the end-to-end congestion control algorithm which may in turn provide further performance gains.

Specifically, in various embodiments, similar to flow control, the accelerator may decouple congestion control between the sender and the receiver altogether. In this split-TCP approach, the accelerator may acknowledge packets before the receiver does, thus substantially speeding up the growth of CWnd at the sender. This will likely improve the performance of short-lived TCP flows, such as web browsing. In addition, packet loss events may also be suppressed completely by the accelerator, thereby keeping the sender from triggering congestion control in the event of random or even congestion-induced packet losses in the mobile link.

9.3 Dynamic Resource Allocation

As described in Chapter 7.2, in various embodiments, a modification may be made to the packet forwarded in the accelerator, for example, to achieve non-uniform bandwidth allocation. Beyond WFQ, the accelerator may also be implemented to provide priority scheduling (e.g., higher priority for real-time traffic), to guarantee bandwidth availability (e.g., for streaming video), or to perform traffic policing (e.g., to limit throughput of P2P traffics).

9.4 Sender-Based Acceleration

While the proposed acceleration algorithms may be designed for use in a network-centric accelerator, some of them in fact may also be implemented at the sender TCP module. For example, opportunistic transmission and a lesser extent loss event suppression may be candidates for implementation in the sender. However, sender-based approach may face new challenges, including the differentiation of mobile and non-mobile TCP flows, the existence of proxied servers in mobile operators, and so on. More research may be warranted to investigate the applicability and performance of sender-based acceleration.

9.5 Machine-Readable Medium

Figure 26:
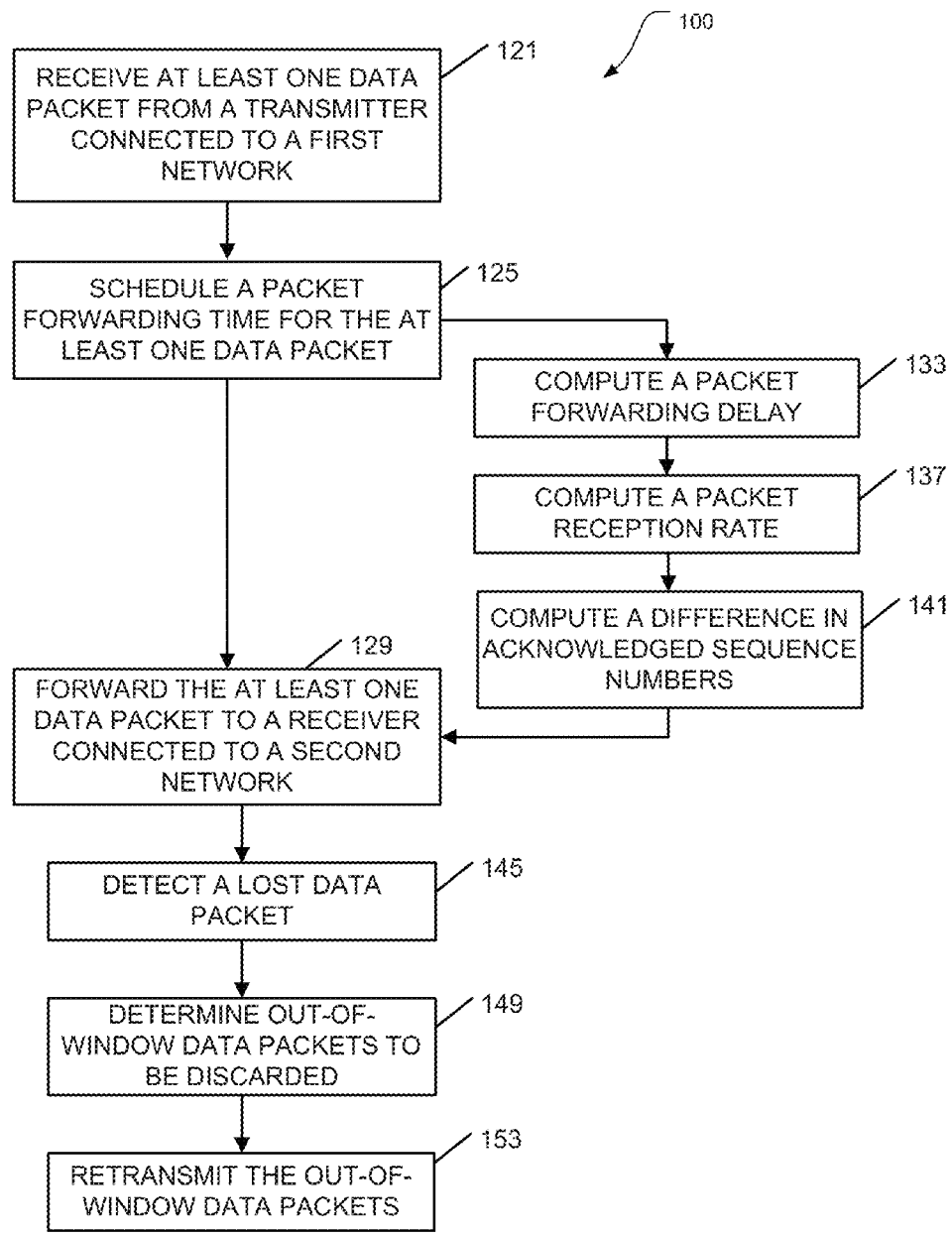
FIG. 26 shows a flow chart illustrating various methods to transmit and receive data packets according to various embodiments.
Figure 27:
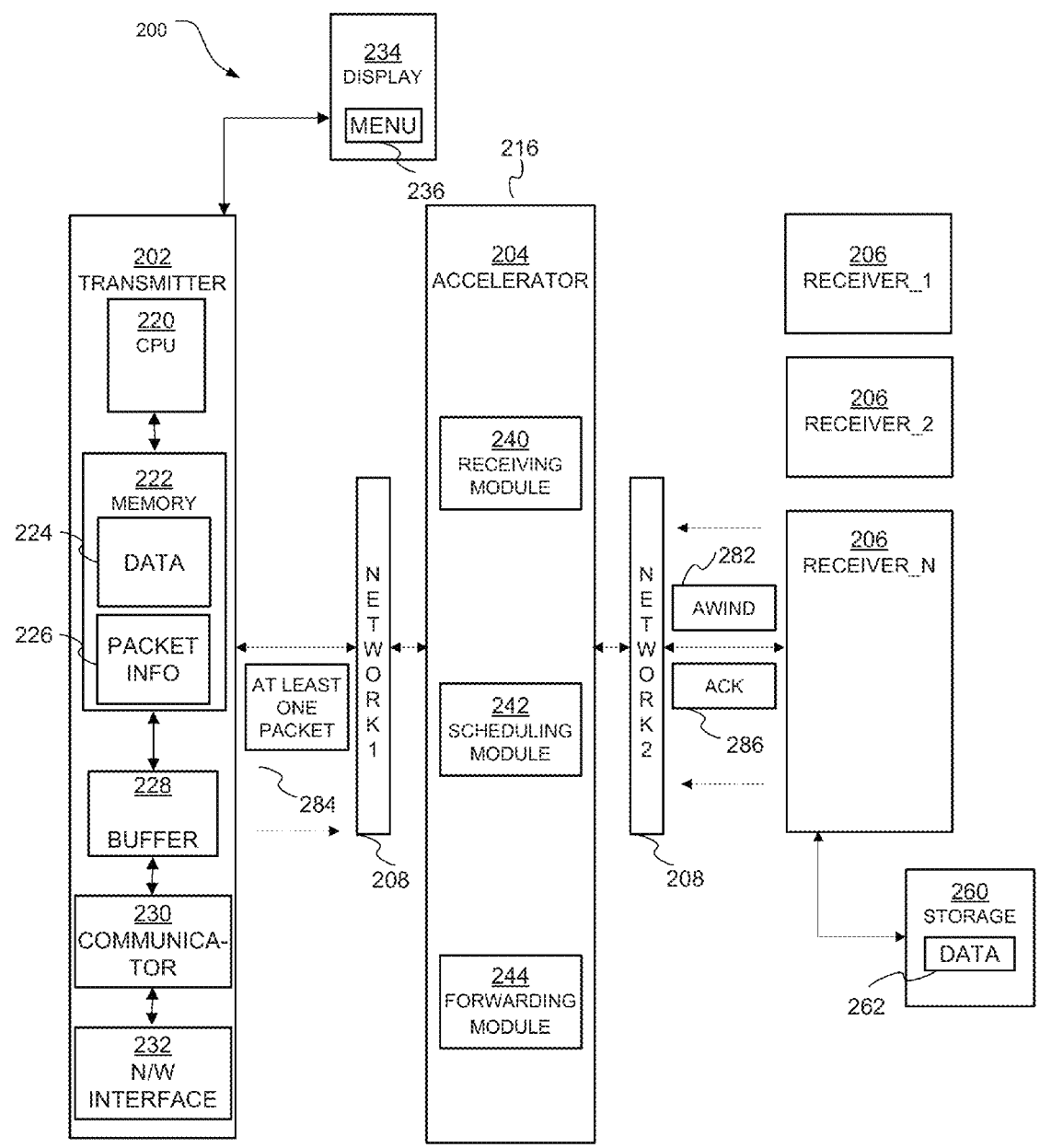
FIG. 27 shows a block diagram of various systems and apparatuses for transmitting and receiving data packets according to various embodiments.

The system 200 and apparatuses 202, 204, 206 in FIG. 27 may be implemented in a machine-accessible and readable medium that is operational over one or more networks 208. The networks 208 may be wired, wireless, or a combination of wired and wireless. Also, at least one of the networks 208 may be a satellite-based communication link, such as the WINDS (Wideband InterNetworking engineering test and Demonstration Satellite) communication link or any other commercial satellite communication links. The system 200 and apparatuses 202, 204, 206 may be used to implement, among other things, the processing associated with the computer-implemented methods 100 of FIG. 26. Modules may comprise hardware, software, and firmware, or any combination of these. Additional embodiments may be realized.

Referring to FIG. 26, the computer-implemented methods 100 according to various embodiments are provided. The methods 100 may begin, at block 121, with receiving at least one data packet from a transmitter connected to a first network. At block 125, a packet forwarding time for the at least one data packet may be scheduled. At block 129, the at least one data packet may be forwarded to a receiver connected to a second network, for example, based on the packet forwarding time such that transmission of the at least one data packet prevents a buffer overflow at the receiver.

In various embodiments, the number of the at least one data packets to be forwarded to the receiver may be determined and informed to the transmitter. In some embodiments, the number of the at least one data packets to be forwarded to the receiver may be calculated, for example, based on the amount of buffers free-up at the receiver and the amount of data packets received at the receiver during a round-trip-delay during a round-trip-delay. In this way, the buffers free-up at the receiver may be utilized and the transmission efficiency may be increased. In some embodiments, a size of the AWnd may be dynamically adjusted, for example, based on the number of the at least one data packet to be forwarded to the receiver determined by the transmitter.

Referring to FIG. 26 again, in various embodiments, at block 133, a packet forwarding delay for the at least one data packet may be calculated, for example, to schedule the packet forwarding time. In some embodiments, at block 137, the packet reception rate may be calculated, for example, to be used in calculating the packet forwarding delay. In some embodiments, at block 141, a difference in acknowledged sequence numbers associated with the at least one data packet may be computed, for example, to be used in calculating the packet reception rate.

In various embodiments, at block 145, a lost data packet may be detected. In some embodiments, at block 149, the out-of-window packets to be discarded by the receiver may be determined. In some embodiments, at block 153, the out-of-window packets may be retransmitted to the receiver before the transmitter times out and retransmits one of the out-of-window packets. In some embodiments, the out-of-window packets may be retransmitted based on suppressing forwarding a duplicate acknowledgement (ACK) received from the receiver to the transmitter. Yet, in some embodiments, the out-of-window packets may be retransmitted based on delaying forwarding an acknowledgement (ACK) received from the receiver to the transmitter. In some embodiments, the forwarding of the ACK may be delayed, for example, by increasing an amount of delayed time according to a number of retransmission attempts.

In various embodiments, a weight may be assigned to each data flow, for example, to be used in scheduling the packet forwarding time. In some embodiments, the weight may indicate a number of packets to be forwarded for each data flow.

Figure 28:
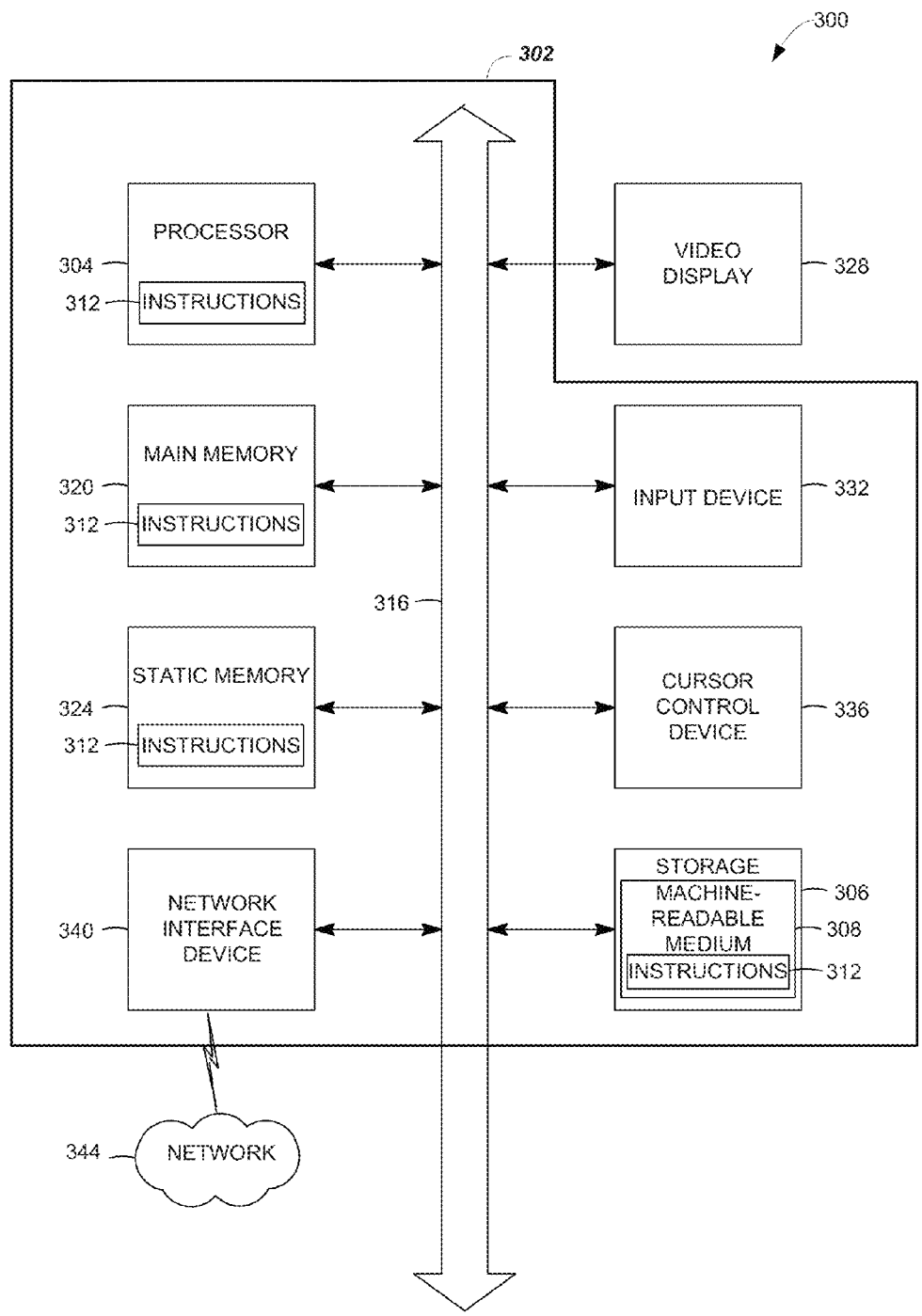
FIG. 28 shows a block diagram of an article of manufacture, including a specific machine, according to various embodiments.

For example, FIG. 28 is a block diagram of an article 300 of manufacture, including a specific machine 302, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 300 of manufacture, such as a computer, a memory system, a magnetic or optical disk, some other storage device, and/or any type of electronic device or system may include one or more processors 304 coupled to a machine-readable medium 308 such as a memory (e.g., removable storage media, as well as any memory including an electrical, optical, or electromagnetic conductor) having instructions 312 stored thereon (e.g., computer program instructions), which when executed by the one or more processors 304 result in the machine 302 performing any of the actions described with respect to the methods above.

The machine 302 may take the form of a specific computer system having a processor 304 coupled to a number of components directly, and/or using a bus 316. Thus, the machine 302 may be similar to or identical to the apparatuses 202, 204, 206 or system 200 shown in FIG. 27.

Turning now to FIG. 28, it can be seen that the components of the machine 302 may include main memory 320, static or non-volatile memory 324, and mass storage 306. Other components coupled to the processor 304 may include an input device 332, such as a keyboard, or a cursor control device 336, such as a mouse. An output device 328, such as a video display, may be located apart from the machine 302 (as shown), or made as an integral part of the machine 302.

A network interface device 340 to couple the processor 304 and other components to a network 344 may also be coupled to the bus 316. The instructions 312 may be transmitted or received over the network 344 via the network interface device 340 utilizing any one of a number of well-known transfer protocols (e.g., HyperText Transfer Protocol and/or Transmission Control Protocol). Any of these elements coupled to the bus 316 may be absent, present singly, or present in plural numbers, depending on the specific embodiment to be realized.

The processor 304, the memories 320, 324, and the storage device 306 may each include instructions 312 which, when executed, cause the machine 302 to perform any one or more of the methods described herein. In some embodiments, the machine 302 operates as a standalone device or may be connected (e.g., networked) to other machines. In a networked environment, the machine 302 may operate in the capacity of a server or a client machine in server-client network environment, or as a peer machine in a peer-to-peer (or distributed) network environment.

The machine 302 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 302 is illustrated, the term "machine" shall also be taken to include any collection of machines that individually or jointly execute a set (or multiple sets) of instructions to perform any one or more of the methodologies discussed herein.

While the machine-readable medium 308 is shown as a single medium, the term "machine-readable medium" should be taken to include a single medium or multiple media (e.g., a centralized or distributed database, and/or associated caches and servers, and or a variety of storage media, such as the registers of the processor 304, memories 320, 324, and the storage device 306 that store the one or more sets of instructions 312). The term "machine-readable medium" shall also be taken to include any medium that is capable of storing, encoding or carrying a set of instructions for execution by the machine and that cause the machine 302 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Chapter 10: Conclusion

Various embodiments of the invention address the performance problem of running TCP over mobile data networks by introducing an accelerator between the sender and the receiver. The accelerator may implement, for example, three acceleration algorithms: (a) opportunistic transmission to overcome the AWnd-induced throughput bottleneck; (b) local retransmission to prevent throughput blackout in the event of packet loss; and (c) loss event suppression to keep the sender CWnd at a high level.

Experimental results conducted in production 3G HSPA networks show that the accelerator can increase the throughput performance of TCP by up to about 2.5 times of the unaccelerated TCP. Moreover, the accelerator can achieve better fairness among competing TCP flows and can also be equipped with dynamic resource allocation algorithms to offer more sophisticated traffic control for the TCP flows.

Last but not least, the proposed accelerator according to various embodiments does not require modification to related applications, TCP implementation at the hosts, or operating system; and thus can be readily deployed in current and future mobile data networks.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A computer-implemented method, comprising:
receiving at least one data packet from a transmitter connected to a first network;
scheduling a packet forwarding time for the at least one data packet; and
forwarding the at least one data packet to a receiver connected to a second network based on the packet forwarding time such that transmission of the at least one data packet prevents a buffer overflow at the receiver, wherein a number of the at least one data packet to be forwarded to the receiver is determined based on amount of buffers freed-up at the receiver and amount of data packets received at the receiver during a round-trip-delay.

2. The method of claim 1, wherein the scheduling of the packet forwarding time includes computing a packet forwarding delay for the at least one data packet.

3. The method of claim 2, wherein the computing of the packet forwarding delay includes computing a packet reception rate by the receiver.

4. The method of claim 3, wherein the computing of the packet reception rate includes calculating a difference in acknowledged sequence numbers associated with the at least one data packet.

5. The method of claim 1, wherein the forwarding of the at least one data packet includes:
based on detecting a lost packet, determining out-of-window packets to be discarded by the receiver; and
retransmitting the out-of-window packets to the receiver before the transmitter times out and retransmits one of the out-of-window packets.

6. The method of claim 5, wherein the retransmitting of the out-of-window packets includes suppressing forwarding a duplicate acknowledgement (ACK) received from the receiver to the transmitter.

7. The method of claim 5, wherein the retransmitting of the out-of-window packets includes delaying forwarding an acknowledgement (ACK) received from the receiver to the transmitter.

8. The method of claim 7, wherein the delaying of the forwarding of the ACK includes increasing an amount of delayed time according to a number of retransmission attempts.

9. The method of claim 1, wherein the scheduling of the packet forwarding time includes assigning a weight to each data flow, the weight indicating a number of packets to be forwarded for each data flow.

10. An apparatus, comprising:
a receiving module to receive at least one data packet from a transmitter connected to a first network;
a scheduling module to schedule a packet forwarding time for the at least one data packet; and
a forwarding module to forward the at least one data packet to a receiver connected to a second network based on the packet forwarding time such that transmission of the at least one data packet prevents a buffer overflow at the receiver, wherein a number of the at least one data packet to be forwarded to the receiver is determined based on amount of buffers freed-up at the receiver and amount of data packets received at the receiver during a round-trip-delay.

11. The apparatus of claim 10, wherein the scheduling module is configured to compute a packet forwarding delay for the at least one data packet to schedule the packet forwarding time.

12. The apparatus of claim 11, wherein the scheduling module is configured to compute a packet reception rate by the receiver to compute the packet forwarding delay.

13. The apparatus of claim 12, wherein the scheduling module is configured to calculate a difference in acknowledged sequence numbers associated with the at least one data packet to compute the packet reception rate.

14. The apparatus of claim 10, wherein the forwarding module is configured to:
determine out-of-window packets to be discarded by the receiver based on detecting at least one lost packet; and
retransmit the out-of-window packets to the receiver before the transmitter times out and retransmits one of the out-of-window packets.

15. The apparatus of 10, wherein the forwarding module is configured to enable suppression of lost events without the need for splitting data flow.

16. The apparatus of claim 10, wherein the receiver comprises a mobile handset.

17. The apparatus of claim 10, wherein the scheduling module is configured to allocate channel resources in a round robin manner to forward the at least one data packet.

18. The apparatus of claim 10, wherein the scheduling module is configured to dynamically adjust a size of a buffer advertized by the receiver based on on-going data flows.

19. The apparatus of claim 10, wherein the at least one data packet comprises a Transmission Control Protocol (TCP) package.

20. A computer-readable non-transitory storage medium storing instructions that, when executed by a processor, cause the processor to perform a method comprising:
receiving at least one data packet from a transmitter connected to a first network;
scheduling a packet forwarding time for the at least one data packet; and
forwarding the at least one data packet to a receiver connected to a second network based on the packet forwarding time such that transmission of the at least one data packet prevents a buffer overflow at the receiver, wherein a number of the at least one data packet to be forwarded to the receiver is determined based on amount of buffers freed-up at the receiver and amount of data packets received at the receiver during a round-trip-delay.

* * * * *